(12) United States Patent
Mohri

(10) Patent No.: US 6,515,669 B1
(45) Date of Patent: Feb. 4, 2003

(54) OPERATION INPUT DEVICE APPLIED TO THREE-DIMENSIONAL INPUT DEVICE

(75) Inventor: Koh Mohri, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/413,230

(22) Filed: Oct. 6, 1999

(30) Foreign Application Priority Data

Oct. 23, 1998 (JP) ............................................ 10-302236

(51) Int. Cl.[7] .............................................. G06T 15/00
(52) U.S. Cl. ........................................ 345/474; 345/418
(58) Field of Search ................................. 345/418, 473, 345/474, 475

(56) References Cited

U.S. PATENT DOCUMENTS

| | | |
|---|---|---|
| 4,414,537 A | 11/1983 | Grimes |
| 4,937,444 A | 6/1990 | Zimmerman |
| 5,097,252 A | 3/1992 | Harvill et al. |
| 5,717,698 A | 2/1998 | Tokioka |
| 6,380,923 B1 | 4/2002 | Fukumoto |

FOREIGN PATENT DOCUMENTS

| | | |
|---|---|---|
| JP | 7-28591 | 1/1995 |
| JP | 07-121294 | 5/1995 |
| JP | 9-102046 | 4/1997 |

*Primary Examiner*—Cliff N. Vo
(74) *Attorney, Agent, or Firm*—Frishauf, Holtz, Goodman & Chick, P.C.

(57) ABSTRACT

An operation input device includes a back-of-hand detection section, spatial coordinate computation section, finger posture detection section, finger shape estimation section, hand shape estimation section, and operation input analysis section. The back-of-hand detection section is mounted on the back of the hand of an operator to detect the motion or posture of the back of the hand. The spatial coordinate computation section obtains the position or posture of the back of the hand in a three-dimensional coordinate system on the basis of an output from the back-of-hand detection section. The finger posture detection section is mounted near the tip of a finger of the operator to detect the posture of the finger. The finger shape estimation section computes the posture of the finger with respect to the back of the hand of the operator from an output from the finger posture detection section by using an output from the spatial coordinate computation section. The hand shape estimation section obtains the overall shape of the hand of the operator on the basis of the outputs from the back-of-hand detection section and the finger shape estimation section. The operation input analysis section generates a command by a predetermined scheme on the basis of the outputs from the hand shape estimation section and the spatial coordinate computation section.

22 Claims, 12 Drawing Sheets

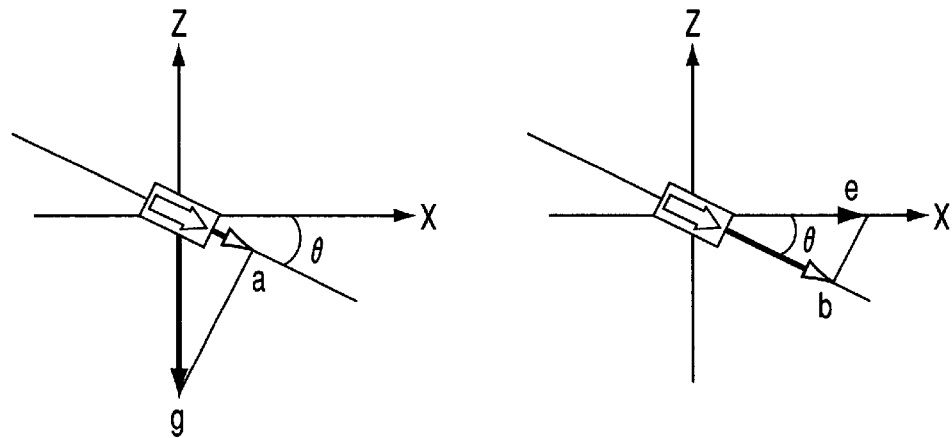
FIG. 9A  FIG. 9B
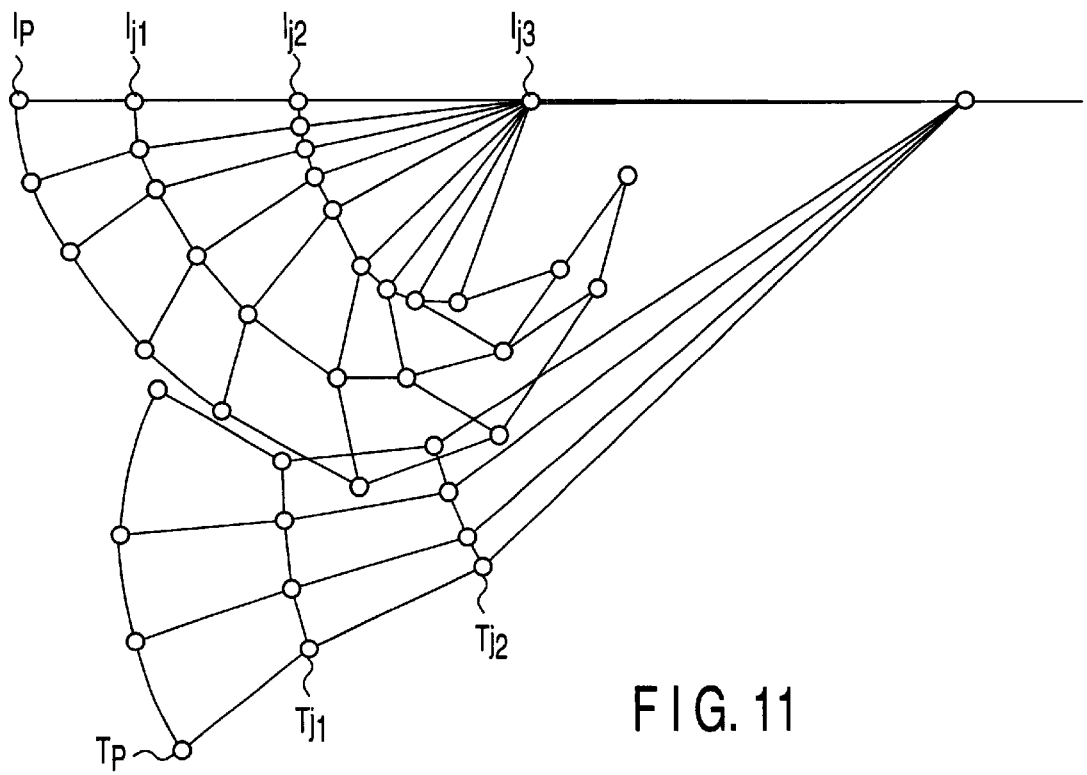
FIG. 11
| θI | 0° | 10° | 20° | 30° | 40° | ------ |
|---|---|---|---|---|---|---|
| θj1 | 0 | 4 | 8 | 12 | 18 | ------ |
| θj2 | 0 | 3 | 6 | 10 | 12 | ------ |
| θj3 | 0 | 3 | 6 | 8 | 10 | ------ |
FIG. 12

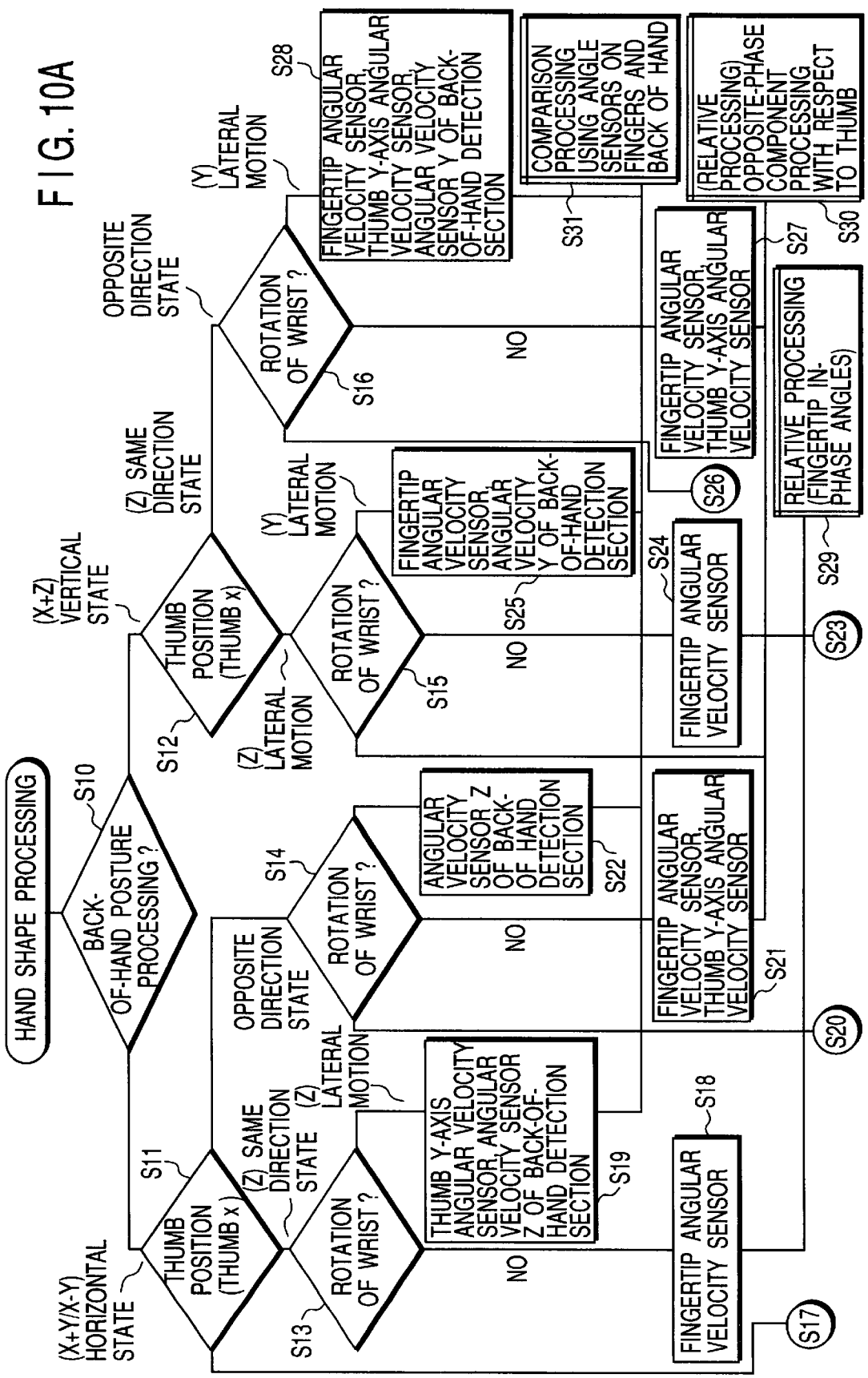

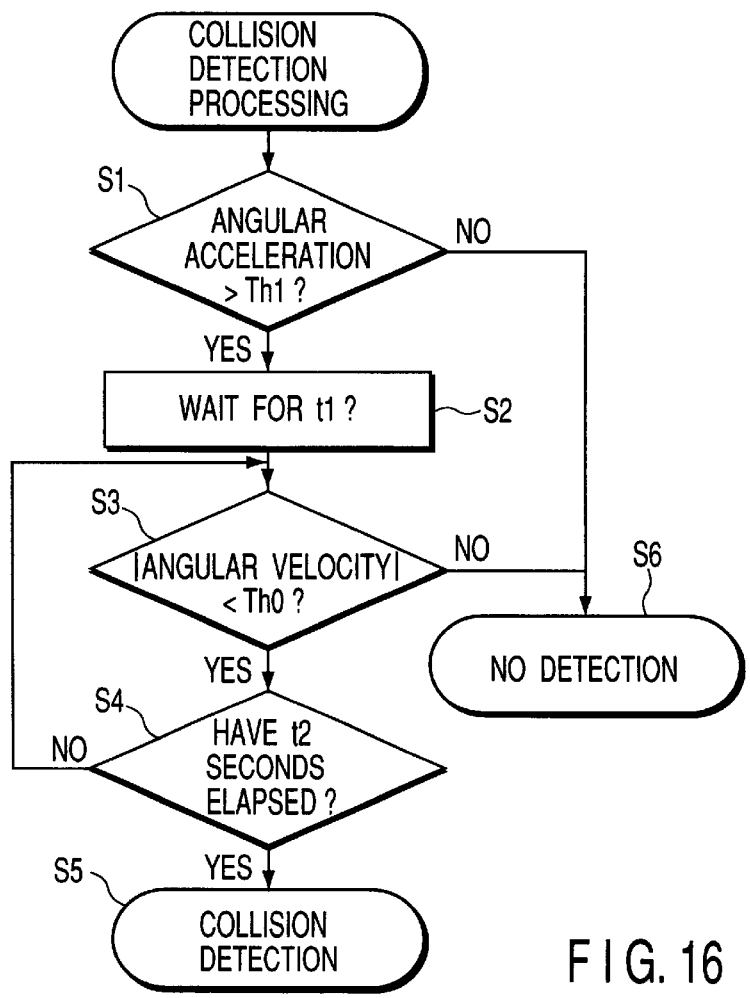

FIG. 15
TRANSFER DATA FORMATS IN PROCESSING MODES (1) HAND SHAPE RAW DATA PROCESSING MODE
[$V_{bx}, V_{by}, V_{bz}, \theta_{bx}, \theta_{by}, \theta_{bz}, \theta_{Tx}, \theta_{Ty}, \theta_I, \theta_M$]

(2) HAND SHAPE PREDICTION DATA PROCESSING MODE
[$V_{bx}, V_{by}, V_{bz}, \theta_{bx}, \theta_{by}, \theta_{bz}, \theta_{T3}, \theta_{T2}, \theta_{T1}, \theta_{I3}, \theta_{I2}, \theta_{I1}, \theta_{M3}, \theta_{M2}, \theta_{M1}$]

(3) THREE-FINGER-RELATED INFORMATION DATA MODE
[$V_{bx}, V_{by}, V_{bz}, \theta_{bx}, \theta_{by}, \theta_{bz}, T_{stat}, I_{stat}, M_{stat}$]

(4) HAND SHAPE CODING TRANSFER MODE
[$V_{bx}, V_{by}, V_{bz}, \theta_{bx}, \theta_{by}, \theta_{bz}, H_{code}$]

(5) PSEUDO-2D MOUSE MODE
[$P_{bx}, P_{by}, B1, B2$]

(6) PSEUDO-JOYSTICK MODE
[Pitch, Roll, Yaw, B1]

FIG. 16

OPERATION INPUT DEVICE APPLIED TO THREE-DIMENSIONAL INPUT DEVICE

BACKGROUND OF THE INVENTION

The present invention relates to an operation input device used for a computer, multimedia, video game, or the like and, more particularly, to a three-dimensional (3D) input device such as a space control mouse which provides a high-operability man-machine interface environment.

The present invention also relates to an operation input device applied to a gesture (spatial motion pattern) input system for implementing an expanded input function based on operation patterns and motion patterns of an operator.

As a conventional computer input device to which an operation input device of this type is applied, for example, an operation system is disclosed in Jpn. Pat. Appln. KOKAI Publication No. 7-28591. According to this operation system, the function of a conventional two-dimensional mouse is expanded by incorporating an acceleration sensor or the like into the two-dimensional mouse as in a 3D mouse or space control mouse, thereby using the two-dimensional mouse as a three-dimensional input device.

In addition, as a device using a scheme of measuring the extent of bending of each finger or palm of the operator with optical fibers and resistive elements mounted on a glove, a data glove or the like is commercially available (Data Glove available from VPL Research; U.S. Pat. Nos. 4,937,444 and 5,097,252).

Jpn. Pat. Appln. KOKAI Publication No. 9-102046 discloses another device designed to detect the shape, motion, and the like of the hand by an image processing scheme.

In using the above operation system like a 3D mouse, since the function of the two-dimensional mouse is expanded, the operator must newly learn a unique operation method based on operation commands for the mouse. This puts a new burden on the operator.

In a device like the above data glove, optical fibers and pressure-sensitive elements are mounted on finger joints to detect changes in the finger joints in accordance with changes in light amount and resistance. For this purpose, many finger joints must be measured. This complicates the device and its control system.

To wear a device like a data glove, calibration or initialization is required to fit the shape of the hand of each user. That is, not every person can readily use such a device. If the glove greatly differs in size from the hand of a person, he/she cannot use it.

When the user wears such a device, he/she has the feeling of being restrained because of the glove-like shape of the device. In addition, since the fingertips and the like are covered with the device, delicate work and operation with the fingertips are hindered. Therefore, the user cannot always wear the device during operation.

In the scheme of detecting the shape, motion, and the like of the hand by the above image processing, a problem arises in terms of the camera position at which the image is captured, and limitations are imposed on the image captured at the position, resulting in poor mobility and portability. Furthermore, the processing apparatus and system for image processing are complicated.

As described above, the respective conventional operation systems have various problems.

BRIEF SUMMARY OF THE INVENTION

The present invention has been made in consideration of the above situation, and has as its object to provide an operation input device which can be realized by a simple system configuration, imposes no new burden on the operator, eliminates the necessity to perform calibration and initialization when the operator wears the device, readily allows anyone to use the device, and allows the operator to perform delicate work and operation with his/her fingertips without any interference.

In order to achieve the above object, according to an aspect of the present invention, there is provided an operation input device comprising:

back-of-hand detection means which is mounted on a back of a hand of an operator to detect a motion or posture of the back of the hand of the operator;

spatial coordinate computation means for obtaining a position or posture of the back of the hand of the operator in a three-dimensional coordinate system on the basis of an output from the back-of-hand detection means;

finger posture detection means which is mounted near a tip of a finger of the operator to detect a posture of the finger of the operator;

finger shape estimation means for computing the posture of the finger with respect to the back of the hand of the operator from an output from the finger posture detection means by using an output from the spatial coordinate computation means;

hand shape estimation means for obtaining an overall shape of the hand of the operator on the basis of the outputs from the back-of-hand detection means and the finger shape estimation means; and operation input analysis means for generating a command by a predetermined scheme on the basis of the outputs from the hand shape estimation means and the spatial coordinate computation means.

According to another aspect, there is provided an operation input device comprising:

a plurality of position or posture sensors which are respectively mounted on fingers and back of a hand of an operator to detect positions or postures of the fingers and back of the hand of the operator;

first means for obtaining a shape of the hand of the operator on the basis of outputs from the sensors; and second means for generating and output a command in accordance with the shape obtained by the first means.

According to still another aspect of the present invention, there is provided an operation input device for performing input operation on the basis of a shape, spatial position, posture, and motion of a hand of an operator, comprising:

back-of-hand detection means for detecting a spatial motion or posture of a back of the hand of the operator;

spatial coordinate computation means for obtaining a position or posture in a three-dimensional space on the basis of information from the back-of-hand detection means;

finger posture detection means for detecting a bending motion or posture of a distal end portion extending from a first joint of each finger;

finger shape estimation means for estimating an overall shape of a finger by estimating a bending angle of the distal end portion of the finger with respect to the back of the hand on the basis of pieces of information detected by the spatial coordinate computation means and the finger posture detection means;

hand shape estimation means for estimating a shape of the hand on the basis of information of the overall shape of each finger from the finger shape estimation means; and operation input analysis means for determining a command to be input by analyzing operation input information from pieces of information from the spatial coordinate computation means and the hand shape estimation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9A is a view for explaining that when an acceleration sensor 12x for detection in the X-axis direction mounted on the back of the hand of the operator travels in the X-axis direction at a kinetic acceleration (e), an acceleration component based on the gravitational acceleration (g) of the earth is given by a=g−sin θ;

FIG. 9B is a view for explaining that a kinetic acceleration component is given by b=e−cos θ, and the acceleration sensor 12x generates a synthetic acceleration signal a+b;

FIGS. 10A and 10B are flow charts for hand shape processing, showing combinations of sensors to be used in the hand shape processing in accordance with the states of the back of the hand and thumb and the motions of the wrist and fingers;

FIG. 11 is a view showing the loci of joint points corresponding to the operation points ($I_p$, $T_p$) of the forefinger and thumb in the gripping action of the hand;

FIG. 12 is a table showing the relative angles ($\theta_{f1}, \theta_{f2}, \theta_{f3}$) of the first, second, and third joints of the forefinger with respect to the angle (finger posture angle information $\theta_I$) defined by the operation point ($I_p$) of the forefinger and the back of the hand;

FIG. 15 is a view showing a transfer data format in each data processing mode;

FIG. 16 is a flow chart showing processing in a collision detection means;

DETAILED DESCRIPTION OF THE INVENTION

Figure 1:
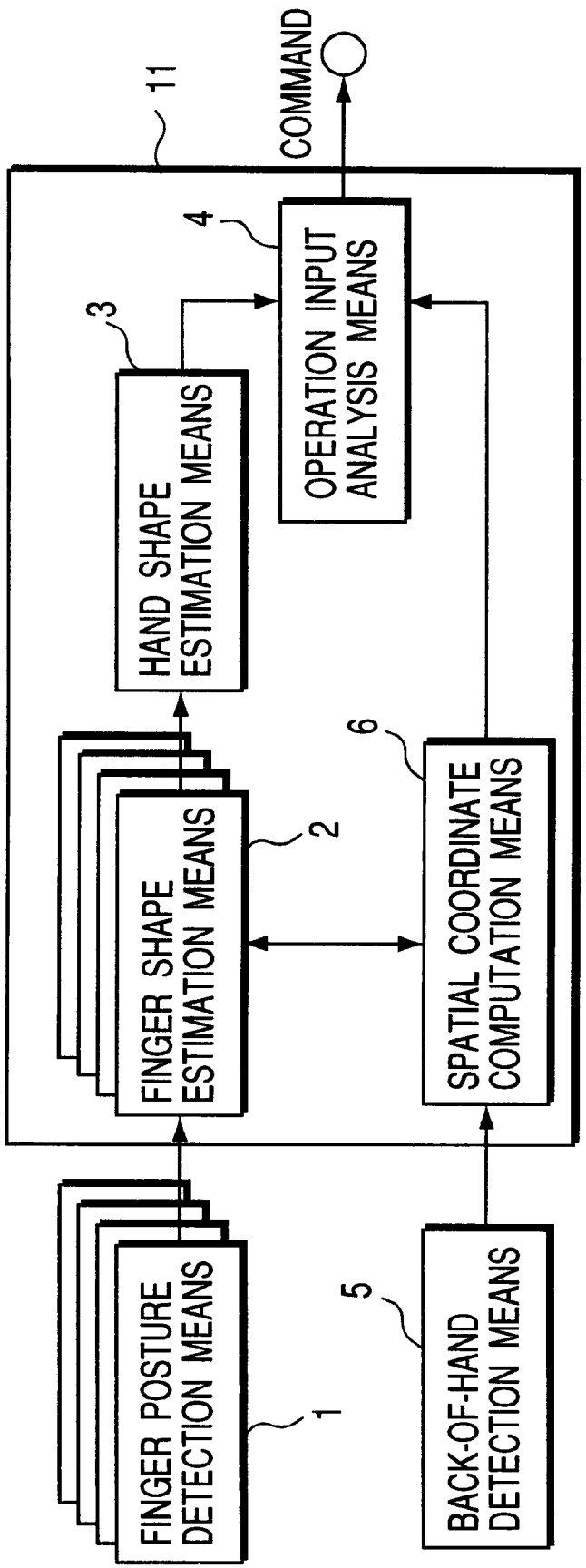
FIG. 1 is a block diagram showing the arrangement of the main part of an operation input device according to an embodiment of the present invention.

Reference will now be made in detail to the presently preferred embodiments of the invention as illustrated in the accompanying drawings, in which like reference numerals designate like or corresponding parts.

An embodiment of the present invention will be described below with reference to the accompanying drawings.

(Arrangement of Main Part of Operation Input Device)

FIG. 1 is a block diagram showing the arrangement of the main part of an operation input device according to an embodiment of the present invention.

As shown in FIG. 1, the operation input device according to the present invention includes a finger posture detection means 1, a finger shape estimation means 2 connected to the finger posture detection means 1, and a hand shape estimation means 3 connected to the finger shape estimation means 2.

As shown in FIG. 1, the operation input device according to the present invention includes a back-of-hand detection means 5, a spatial coordinate computation means 6 connected to the back-of-hand detection means 5 and finger shape estimation means 2, and an operation input analysis means 4 connected to the spatial coordinate computation means 6 and hand shape estimation means 3.

Assume that in the operation input device, the finger shape estimation means 2, hand shape estimation means 3, operation input analysis means 4, and spatial coordinate computation means 6 are constituted by a microcomputer and a CPU 11 including peripheral circuits of the microcomputer.

(Model)

Figure 2:
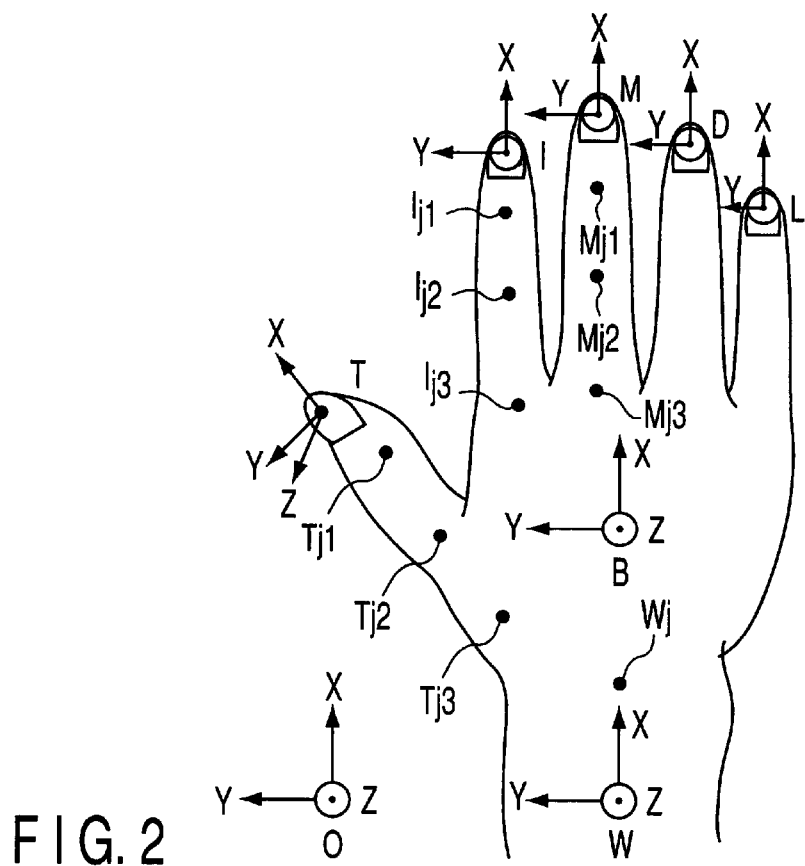
FIG. 2 is a view showing a state wherein coordinate systems and the like are defined for the fingers, joints, and the like of the right hand when viewed from the back of the hand spread forward.

FIG. 2 shows a case wherein coordinate systems and the like are defined for the respective fingers, joints, and the like of the right hand when viewed from the back of the hand spread forward.

Referring to FIG. 2, reference symbol OXYZ denotes a fixed spatial coordinate system in this measurement space, in which the Z-axis direction coincides with the gravitational direction.

Normally, the position at which the system is initialized when it starts is the origin.

Reference symbol BXYZ denotes a back-of-hand coordinate system with the back of the hand serving as the origin. In initialization, the back-of-hand coordinate system BXYZ coincides with the fixed spatial coordinate system OXYZ.

Assume that the fingertip direction, thumb direction, and upward direction perpendicular to the X-Y plane on the back of the hand are respectively defined as a +X-axis, +Y-axis, and +Z-axis.

The clockwise rotational directions relative to the traveling directions (+axis directions) of the X-, Y-, and Z-axes are respectively defined as a +Roll direction, +Pitch direction, and +Yaw direction.

Likewise, coordinate systems are independently defined for the respective fingertips.

The fingertip direction, upward direction perpendicular to the nail, and leftward direction relative to the X-Z plane are respectively defined as a +X-axis, +Z-axis, and +Y-axis.

A thumb coordinate system TXYZ, forefinger coordinate system IXYZ, middle finger coordinate system MXYZ, ring finger coordinate system DXYZ, and little finger coordinate system LXYZ (each fingertip coordinate system is a relative coordinate system with respect to the back-of-hand coordinate system BXYZ) are set.

Figure 3:
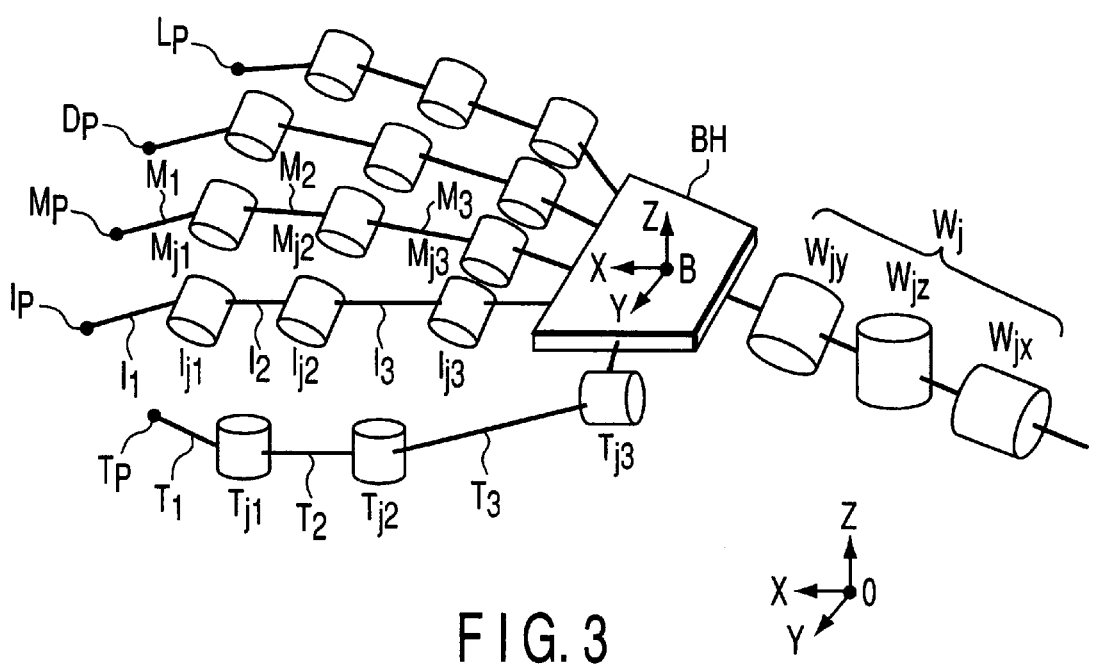
FIG. 3 is a view showing a hand skeleton model assumed in the present invention.

FIG. 3 shows a hand skeleton model assumed in the present invention.

As a joint portion corresponding to each joint, a one-degree-of-freedom joint that rotates only in one axial direction is shown.

The operation points of the fingertip links are respectively defined as a thumb $T_p$, forefinger $I_p$, middle finger $M_p$, ring finger $D_p$, and little finger $L_p$, and the same coordinate systems as those in FIG. 2 are defined for them. In addition, symbols for the respective joints and the like correspond to those in FIG. 2, and subscripts j1, j2, and j3 respective indicate the first, second, and third joints.

Each finger joint other than the thumb finger joint has one degree of freedom and rotates only in the Pitch direction, i.e., rotate about the Y-axis in the back-of-hand coordinate system BXYZ. The thumb has two degrees of freedom, and the wrist has three degrees of freedom.

Figure 4:
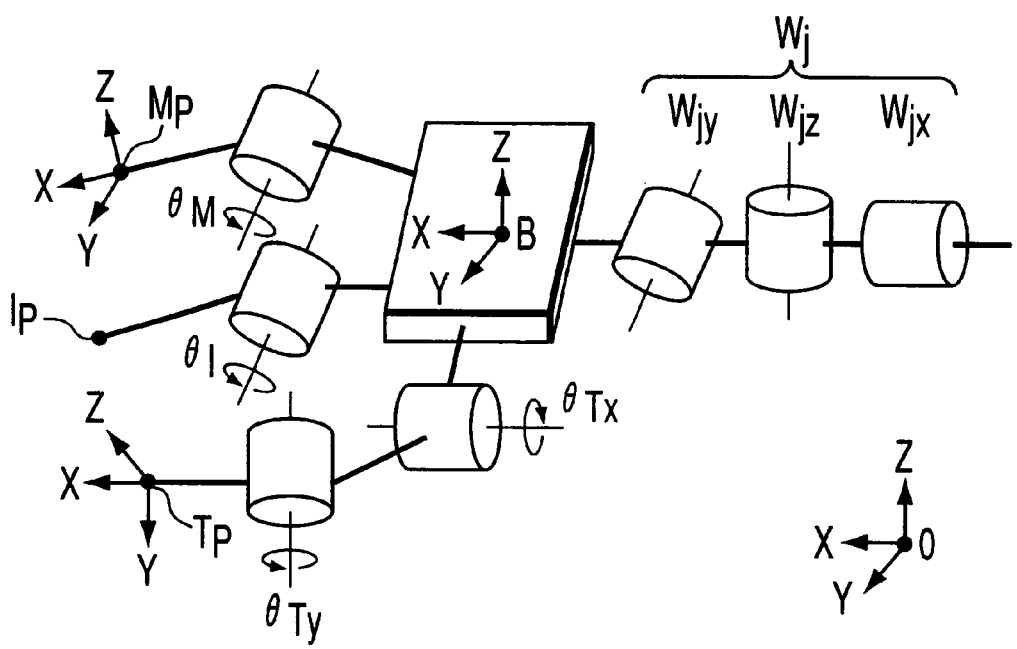
FIG. 4 is a view showing a hand shape model in a three-finger type operation input device according to this embodiment.

FIG. 4 shows a hand-like model in a three-finger operation input device in this embodiment.

Detection coordinates for detecting the position and posture of the back of the hand in this model and the angles of the respective joints relative to the back of the hand are indicated by symbols.

Figure 5:
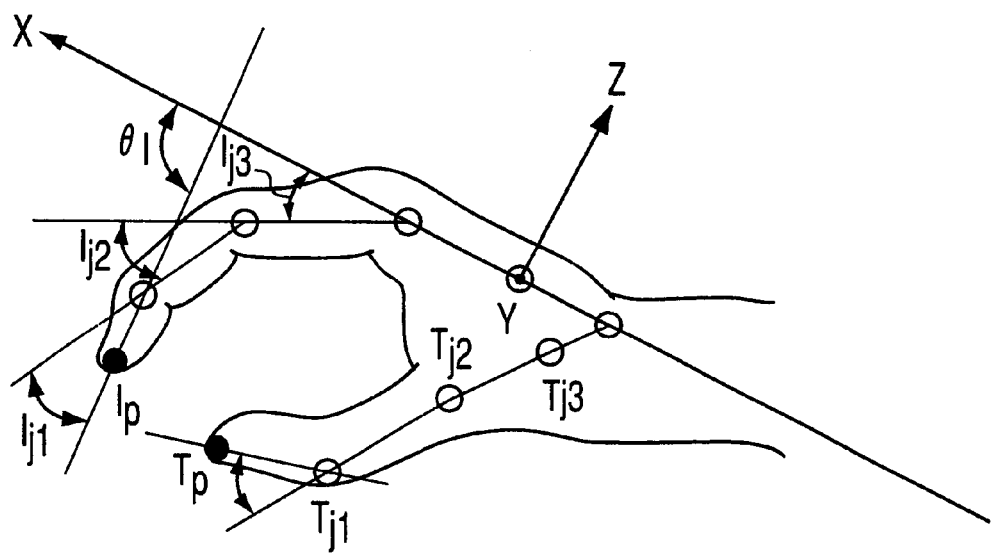
FIG. 5 is a view showing a state wherein fingertip angles are defined with respect the back of the hand as a thumb Y-axis rotational angle ($\theta_{Ty}$), thumb X-axis rotational angle ($\theta_{Tx}$) forefinger Y-axis rotational angle ($\theta_I$) and middle finger Y-axis rotational angle ($\theta_M$), and each joint information is defined by relative angle information between adjacent joints when the hand is viewed from its side.

As the angles of fingertips, a thumb Y-axis rotational angle ($\theta_{Ty}$) thumb X-axis rotational angle ($\theta_{Tx}$), forefinger Y-axis rotational angle ($\theta_I$), and middle finger Y-axis rotational angle ($\theta_M$) are set. The respective pieces of joint information are defined by pieces of relative angle information between the adjacent joints when the hand is viewed from its side as shown in FIG. 5.

The joint angles in this case are made to correspond to equations (1):

$$\theta_{Ty}=Tj1+Tj2, \theta_{Tx}=Tj3,$$

$$\theta_M=Mj1+Mj2+Mj3,$$

$$\theta_I=Ij1+Ij2+Ij3 \qquad (1)$$

The posture information of the operation point of each fingertip indicates the synthetic value of first joint information, second joint information, and third joint information.

Figure 6:
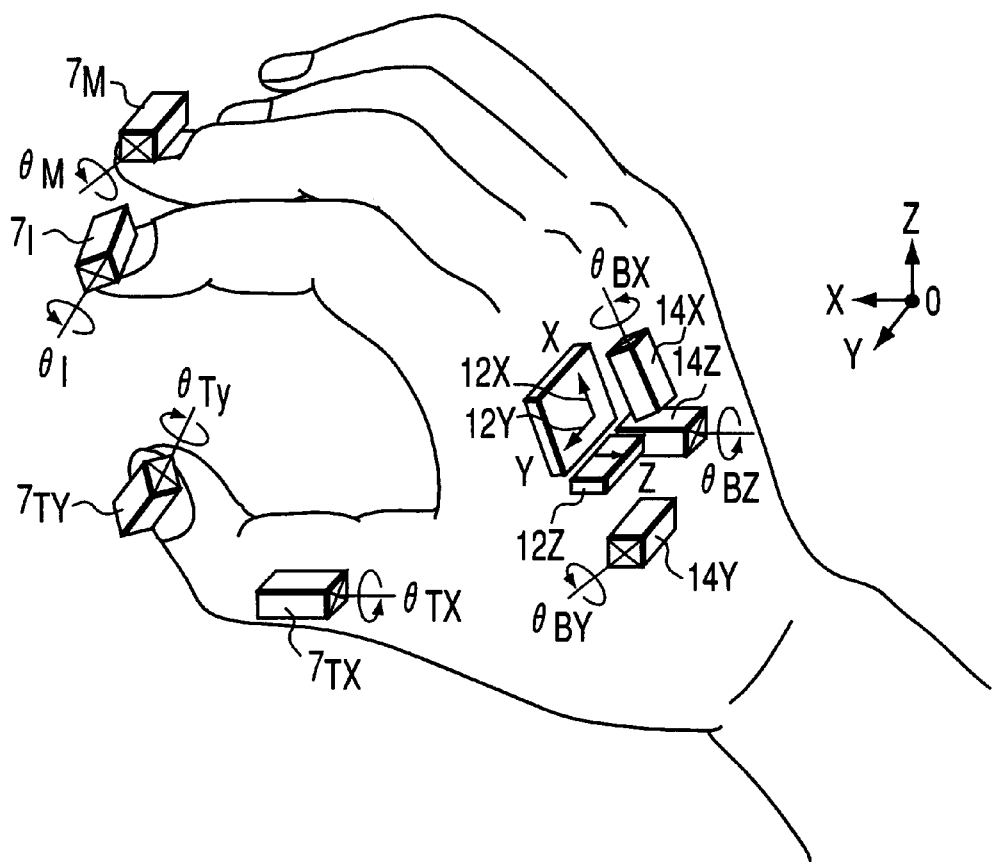
FIG. 6 is a view showing an image indicating an arrangement in which angle information as posture information of each fingertip is detected by detecting rotation about the Y-axis (Pitch direction) of a fingertip coordinate system XYZ with an angular velocity sensor, and the position (Xb, Yb, zb) and tilt (Pitch, Roll) of the back of the hand are detected by acceleration sensors 12 and angular velocity sensors 14.

FIG. 6 shows an image indicating a state wherein the angle information as the posture information of each fingertip around the Y-axis (Pitch direction) in a fingertip coordinate system XYZ is detected by angular velocity sensors, and the position (Xb, Yb, Zb) and tilt (Pitch, Roll) of the back of the hand are detected by acceleration sensors 12 and angular velocity sensors 14.

More specifically, as each angular velocity sensor 14, a vibration gyro sensor for detecting an angle velocity momentum in a one-axis rotational direction is used. FIG. 6 shows a state in the direction in which the vibration gyro sensor for detecting rotation about the axis in the major-axis direction is mounted.

As the acceleration sensors 12 as the back-of-hand detection means 5, semiconductor acceleration sensors on three axes are combined.

FIG. 6 shows how two-axis acceleration sensors 12x and 12y and a one-axis acceleration sensor 12z are combined.

(Detailed Circuit Arrangement)

Figure 8:
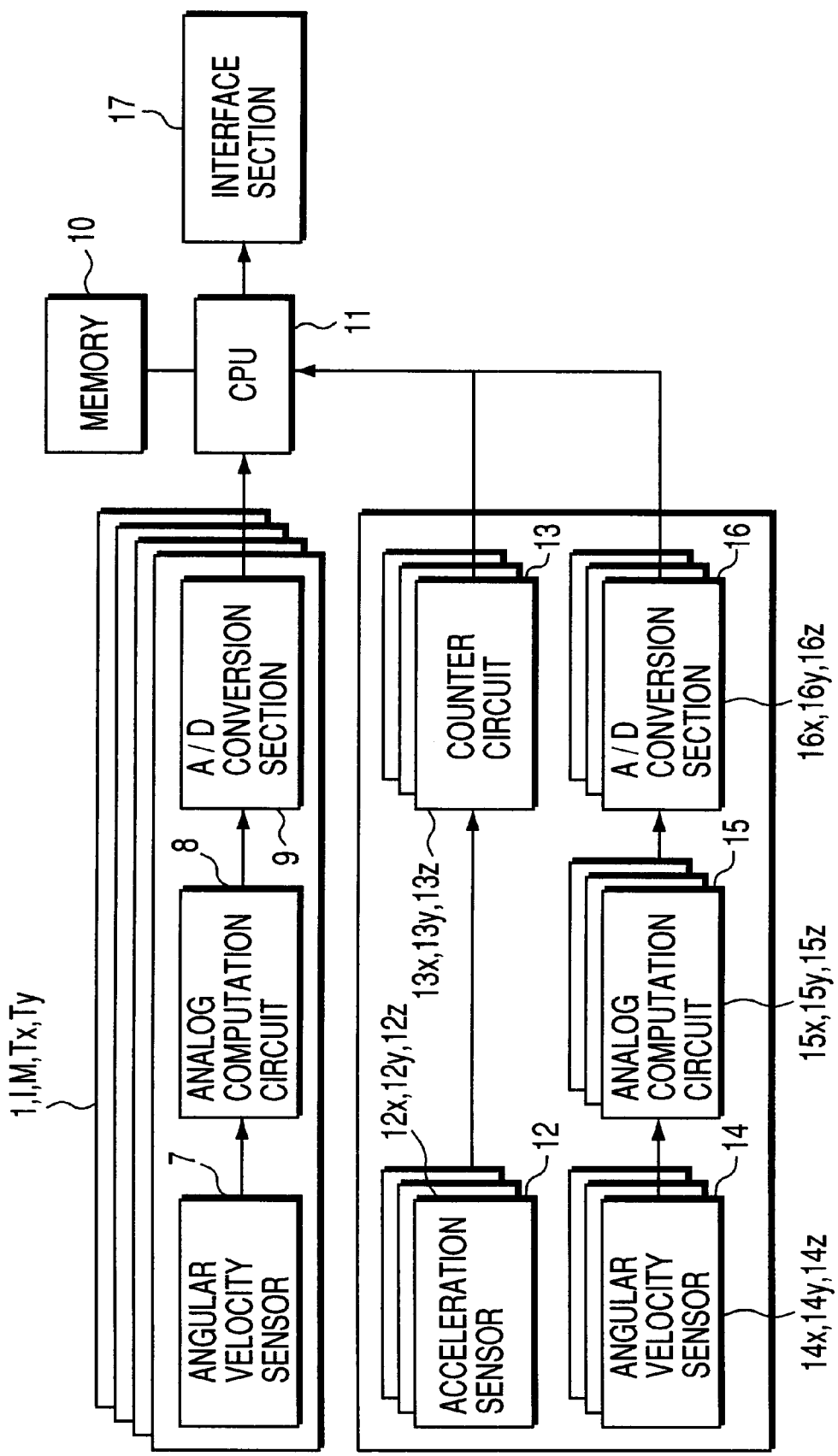
FIG. 8 is a block diagram showing the detailed circuit arrangements of a finger posture detection means 1 and back-of-hand detection means 5.

FIG. 8 is a block diagram showing the detailed circuit arrangements of the finger posture detection means 1 and back-of-hand detection means 5 in FIG. 1.

The finger posture detection means 1 is comprised of an angular velocity sensor 7, analog computation circuit 8, and analog/digital (A/D) conversion section 9 to detect the posture of each fingertip of the operator.

In this case, the angular velocity sensor 7 is mounted on a fingertip of the operator and serves as a sensor element for detecting the angular velocity generated by rotational motion based on bending/extending of the fingertip.

The angular velocity signal detected by the angular velocity sensor 7 is supplied to the analog computation circuit 8.

The analog computation circuit 8 amplifies the angular velocity signal supplied from the angular velocity sensor 7 to match the signal with the conversion range of the A/D conversion section 9, and sends the signal to the A/D conversion section 9.

The A/D conversion section 9 converts an analog signal from the analog computation circuit 8 into a digital signal.

The angular velocity signal having undergone conversion by the A/D conversion section 9 is supplied to the CPU 11.

At the same time, the analog computation circuit 8 has the bandpass filter function of cutting unnecessary signal components in the low- and high-frequency ranges of the angular velocity signal.

The finger posture detection means 1 (I, M, Tx, Ty) equal in number to the two axes of the thumb and the remaining fingers are disposed parallel to each other.

To detect the position and posture of the back of the hand of the operator, the back-of-hand detection means 5 is comprised of the three acceleration sensors 12 disposed on three orthogonal axes, counter circuits 13, the three angular velocity sensors 14 disposed on the same axes as those of the acceleration sensors 12, analog computation circuits 15, and A/D conversion sections 16.

The acceleration sensors 12 are mounted on the back of the hand of the operator. One of these sensors detects a signal proportional to a kinetic acceleration in the moving direction of the back of the hand.

The acceleration sensor 12 also serves as a tilt sensor for detecting a gravitational acceleration (1G) that changes in accordance with the tilt of the back of the hand of the operator.

The signal detected by the acceleration sensor 12 is PWD (pulse-width)-modulated and output. When the counter circuit 13 counts the duty ratio (H/L ratio of the pulse width) of this signal, the detected acceleration information can be converted.

The acceleration signal having undergone conversion by the counter circuit 13 is supplied to the CPU 11.

The arrangement and operation of the functional block constituted by the angular velocity sensor 14, analog computation circuit 15, and A/d conversion section 16 are almost the same as those of the finger posture detection means 1.

The angular velocity sensors 14 are mounted on the back of the hand of the operator to serve as sensor elements for detecting the angular velocity generated by rotational motion based on the tilt of the back of the hand of the operator.

One of these pieces of angular velocity information is used to separate the tilt information and kinetic acceleration information obtained the acceleration sensors 12.

As described above, to detect an acceleration signal and angular velocity signal in a three-dimensional space, the internal circuit arrangement of the back-of-hand detection means 5 is comprised of the three acceleration sensors 12$x$, 12$y$, and 12$z$, three counters 13$x$, 13$y$, and 13$z$, three angular velocity sensors 14$x$, 14$y$, and 14$z$, three analog computation circuits 15$x$, 15$y$, and 15$z$, and three A/D conversion sections 16$x$, 16$y$, and 16$z$.

Note that the A/D conversion sections 16$x$, 16$y$, and 16$z$ may be designed to perform conversion while switching the inputs of one converter using a multiplexer function, or may be used together with the A/D conversion section 16 used in the finger posture detection means 1.

A memory 10 and interface section 17 are connected to the CPU 11.

(Detection of Posture of Back of Hand)

In the CPU 11, the spatial coordinate computation means 6 performs computation processing for obtaining the position and posture of the back of the hand of the operator on the basis of three acceleration signals and three angular velocity signals as pieces of information from the back-of-hand detection means 5.

Each acceleration signal is information obtained by synthesizing a kinetic acceleration component and gravitational acceleration component.

When the acceleration sensor 12$x$ for detection in the X-axis direction, which is mounted on the back of the hand of the operator, travels in the X-axis direction with a tilt $\theta$ and kinetic acceleration (e), as shown in FIGS. 9A and 9B, the acceleration component based on the gravitational acceleration (g) of the earth is given by a=g–sin $\theta$ (FIG. 9A), and the kinetic acceleration component is given by b=e–cos $\theta$ (FIG. 9B). The acceleration sensor 12$x$ generates a synthetic acceleration signal a+b.

Angle displacement information obtained by time-integrating angular velocity information obtained by the angular velocity sensor 14 is used for a computation to separate the gravitational acceleration component as the tilt component of the acceleration sensor 12.

With regard to the tilt in the X-axis direction, a rotational angle displacement is obtained by time-integrating an angular velocity signal from the angular velocity sensor 14$y$ for measuring rotational motion about the Y-axis.

In general, a drift due to an offset value is produced in an output signal from the angular velocity sensor 14 owing to the influences of temperature and vibration.

Errors are accumulated in the angle information obtained by time-integrating this signal.

In contrast to this, the acceleration information obtained by the acceleration sensor 12 is the synthetic value of tilt information as a DC component and kinetic acceleration information as an AC component. As described above, therefore, no errors are accumulated in the tilt information obtained by low-pass-filtering the low-frequency components of the signal from the acceleration sensor 12.

A tilt can be accurately obtained by comparing and referring to the tilt information from the acceleration sensor 12 and the angle displacement information from the angular velocity sensor 14.

As described above, by separating a gravitational acceleration component as tilt information of the acceleration sensor 12, kinetic acceleration information can also be separated.

This kinetic acceleration information can be used as velocity information representing displacements on the three axes by time-integrating the kinetic acceleration information. In addition, the kinetic acceleration information can be converted into translation position information by time integration.

(Finger Posture Angle)

The finger shape estimation means 2 time-integrates an angular velocity signal as information from the finger posture detection means 1 into angle information.

The angular velocity information obtained by the angular velocity sensor 14 mounted on a fingertip of the operator may contain information based on the rotational motion of the wrist of the operator which moves in the same direction as the mounting rotation detection direction.

The finger shape estimation means 2 can obtain the angle information of a fingertip of the operator with respect to the back of the hand by subtracting the tilt information obtained by the spatial coordinate computation means 6 from this angle information.

The finger shape estimation means 2 can therefore obtain the posture angle of each finger of the operator with respect to the back of the hand.

This information, however, represents the motion of the finger while the back of the hand of the operator faces upward or downward. This information needs to be further processed while the back of the hand is directed outward or in consideration of the state of the thumb. This processing will be described later.

The hand shape estimation means 3 estimates the shape of the hand of the operator in accordance with the angle information of each finger and positional relationship between each finger and the back of the hand which are obtained from the finger shape estimation means 2.

The operation input analysis means 4 analyzes the gesture of the hand of the operator on the basis of the hand shape information obtained from the hand shape estimation means 3 and the spatial posture and motion information of the hand from the spatial coordinate computation means 6, and transfers operation input command information data to the interface section 17 in FIG. 8.

(Thumb Model)

When the finger posture detection means 1 is to be applied to the thumb of the operator, this means is mounted by a method different from the mounting method for the remaining fingers.

The thumb has not only the finger bending function based on the first and second joints but also the function of moving in an opposite direction to the palm by using the third joint, the finger posture detection means 1 includes two posture detection means to detect the respective movements.

More specifically, a thumb first posture detection means detects the postures ($\theta_{Ty}$) of the first and second joints, and a thumb second posture detection means detects the posture ($\theta_{Tx}$) of the third joint.

In this case, the internal arrangement and function of each of these angular velocity sensors are the same as those of the finger posture detection means 1 except that their mounting positions and directions are slightly differ from each other.

Figure 7:
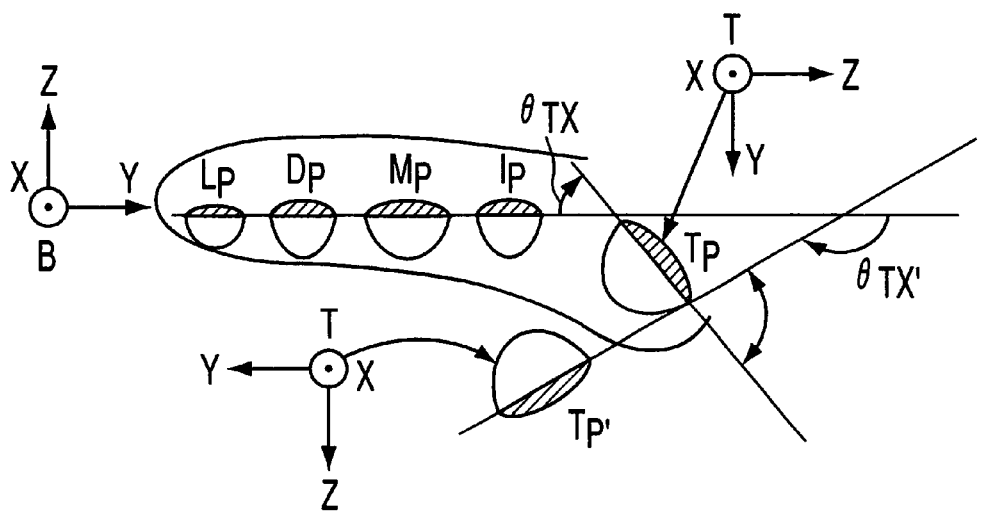
FIG. 7 is a view showing the positional relationship between the fingers when viewed from the fingertip side to the wrist side.

FIG. 7 shows the positional relationship between the fingertips when viewed from the fingertip side to the wrist side.

FIG. 7 shows the positional relationship between the thumb coordinate system TXYZ and the remaining fingers, in particular.

$T_p$ indicates a state wherein the thumb and the remaining fingers are set in the same direction (this state is defined as a same direction state), i.e., the palm is open, whereas $T_p'$ indicates a state wherein the thumb and the remaining fingers are set in opposite directions (this state is defined as an opposite direction state), i.e., a state wherein the hand holds an object.

That is, FIG. 7 shows the minimum and maximum values of rotation ($\theta_{Tx}$) of the thumb around the X-axis in the thumb coordinate system TXYZ.

The Y-axis direction in the thumb coordinate system TXYZ almost coincides with the −Z-axis direction in the back-of-hand coordinate system BXYZ in the state indicated by $T_p$, and almost coincides with −Y-axis direction in the back-of-hand coordinate system BXYZ in the state indicated by $T_p'$.

That is, the angular velocity sensors are positioned to detect rotation about the Y-axis of the thumb coordinate system TXYZ.

This positioning makes it possible to easily compare an angular velocity signal based on the thumb with angular velocity signals based on the remaining fingers when the opposite direction state ($T_p'$) is set.

However, the detection axis of the angular velocity sensor 7 of the finger posture detection means 1 shifts from the bending direction of the thumb with the first and second joints.

An angle corresponding to this shift is subjected to correction computation.

(Hand Shape Estimation)

As described above, in the hand shape estimation means 3, different computation methods are used in the CPU 11 depending on the posture of the hand and the state of the thumb.

The spatial coordinate computation means 6 obtains the position and posture of the back of the hand on the basis of the acceleration information and angular velocity information detected by the back-of-hand detection means 5. The tilt information from the acceleration sensor 12 can only be detected as Roll and Pitch with respect to the fixed spatial coordinate system OXYZ.

With regard to the Yaw direction, since only angular velocity information can be detected by the angular velocity sensor 14, a rotation angle in the Yaw direction from which errors are completely removed cannot be obtained.

The rotation axis around which the acceleration sensor cannot detect rotation changes depending on the posture of the hand in the back-of-hand coordinate system BXYZ.

Figure 10B:
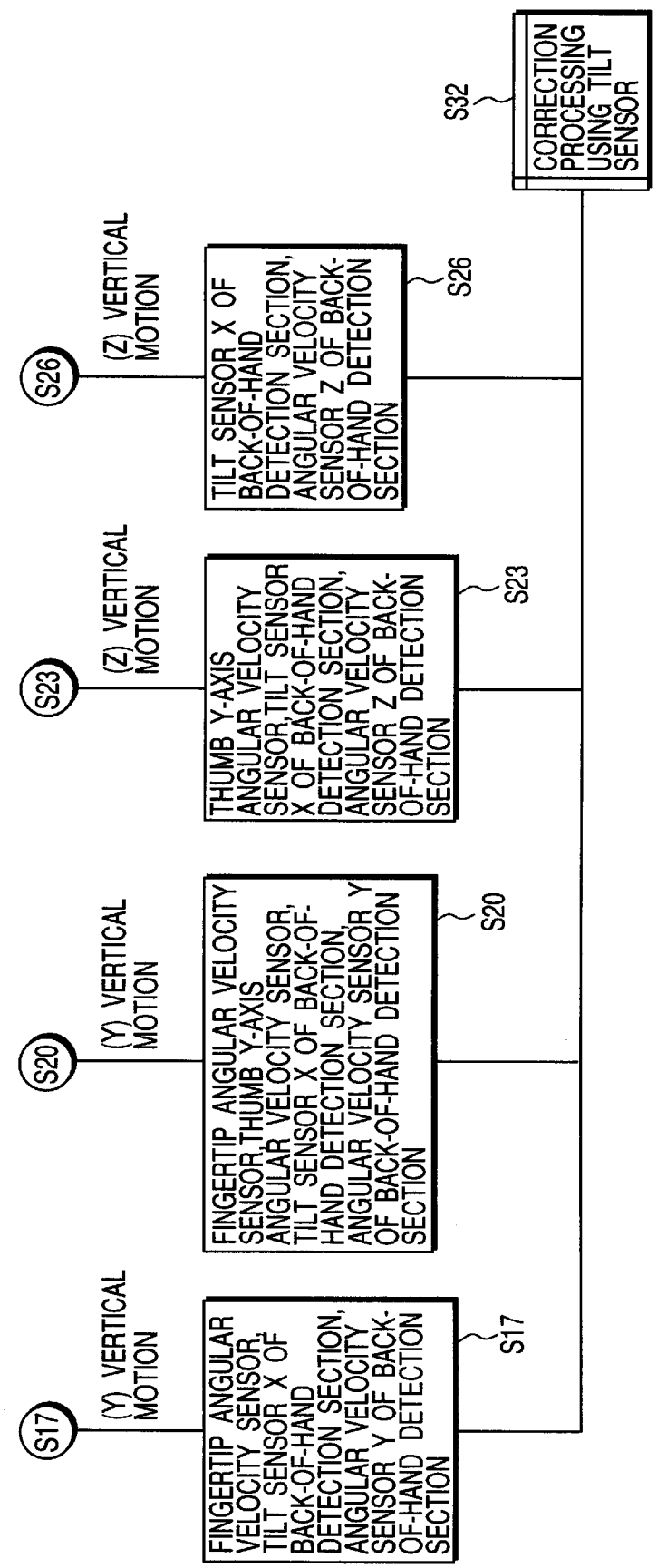

FIGS. 10A and 10B show combinations of sensors to be used depending on the state of back of the hand, the state of the thumb, and the motions of the wrist and fingers in hand shape processing, and a flow chart for the processing.

When only the fingertip moves without any movement of the wrist, processing is performed on the basis of angle information calculated by time integration processing of angular velocity information from the angular velocity sensor 7 (steps S29 and S30).

When the thumb is in the opposite direction state (steps S21 and S27), comparison processing (step S30) can be performed by using the angular velocity sensor 7 (Ty) of the thumb first posture detection means and the angular velocity sensors 7 (I, M) on the fingertips.

Assume that the wrist moves laterally around the Yaw axis.

In this case, while the back of the hand faces up or the palm faces up (this state defined as a horizontal state) (step S11), motion about the Z-axis in the back-of-hand coordinate system BXYZ is motion about the Yaw axis (steps S19 and S22).

In a state wherein the back of the hand is directed outward (this state is defined as a vertical state) (step S12), motion about the Y-axis in the back-of-hand coordinate system BXYZ is motion in the Yaw direction (steps S25 and S28).

Since this motion in the Yaw direction cannot be detected by the acceleration sensor 12, Yaw angle information from the spatial coordinate computation means 6 may contain an error.

The precision of the information can be improved by comparing information from the angular velocity sensor 7 (Tx) on the fingertip and information from the angular velocity sensors 14 (14y, 14z) for detecting rotation about the Yaw axis of the back-of-hand detection means 5 in consideration of directions (step S31).

Assume that the horizontal state is set, and the thumb is in the same direction state (step S13). In this case, since the thumb first posture detection means on the thumb coincides with the Z-axis in the back-of-hand coordinate system BXYZ upon lateral motion of the wrist (step S19), the angular velocity information from the angular velocity sensor 7 (Ty) changes. As a consequence, changes in the postures of the first and second joints of the thumb are detected.

This makes it impossible to discriminate whether the operator has moved the wrist or bent the thumb.

In this case, with comparison with information from the angular velocity sensor 14z of the back-of-hand detection means 5 which detects rotation about the Z-axis, the motion of the wrist generates an opposite-phase angular velocity. The angular velocity can therefore be subtracted.

When the wrist moves up and down, the posture of each fingertip can be correctly computed from the tilt information obtained when the spatial coordinate computation means 6 correctly computes information from the back-of-hand detection means 5 (step S32) regardless of the horizontal state (steps S17 and S20) and the vertical state (steps S23 and S26).

For example, when the horizontal state is set and the thumb is set in the opposite direction state (step S14), the thumb first posture detection means and the respective angular velocity sensors 7 of the finger posture detection means 1 detect angular velocity information based on the rotational motion of the wrist as opposite-phase angular velocity signals (step S20).

In addition, the angular velocity sensors 7 of the finger posture detection means 1 on the forefinger and middle finger detect angular velocity information based on the rotational motion of the wrist as in-phase angular velocity signals.

When the respective finger posture angles are detected as relative values, the relationship between the respective fingers remains unchanged. This makes it possible to recognize the shape of the wrist regardless of the motion of the wrist, thus further improving the precision (step 32).

(Operation Input Analysis)

The operation input analysis means 4 has several operation input processing modes. In accordance with the operation mode of the hand shape estimation means 3, the processing to be performed in this mode and transfer data information for this operation are selected.

In general, the operation input device of the present invention is connected as an input device for a personal computer (host PC) serving as a host.

The mode can be changed even while processing is performed in a given operation input processing mode.

FIG. 15 shows a transfer data format in each of the following data processing modes.

First, a hand shape raw data processing mode (1) is available.

Transfer data contains velocity information ($V_{bx}$, $V_{by}$, $V_{bz}$) and posture information ($\theta_{bx}$, $\theta_{by}$, and $\theta_{bz}$) representing the spatial posture of the back of the hand and posture angle information ($\theta_{Tx}$, $\theta_{Ty}$, $\theta_{I}$, $\theta_{M}$) of the respective fingertips with respect to the back of the hand.

The operation input analysis means 4 converts information from the hand shape estimation means 3 and information from the spatial coordinate computation means 6 into information complying with the transfer data format and transfers the information.

The host PC receives the information from this operation input device and can estimate the hand shape or perform 3D model computer graphics (CG) display of the hand like virtual-reality (VR) display.

In CG processing for the hand, a multi-joint 3D model can be displayed from only pieces of angle information of the back of the hand and fingertips by using inverse kinematics processing or the like.

A hand shape prediction data processing mode (2) is available.

The transfer data contains velocity information ($V_{bx}$, $V_{by}$, $V_{bz}$) and posture information ($\theta_{bx}$, $\theta_{by}$, and $\theta_{bz}$) representing the spatial posture of the back of the hand and relative angle information of the respective finger joints relative to the back of the hand (thumb: $\theta_{T3}$, $\theta_{T2}$, $\theta_{T1}$,; forefinger: $\theta_{I3}$, $\theta_{I2}$, $\theta_{I1}$,; and middle finger: $\theta_{M3}$, $\theta_{M2}$, $\theta_{M1}$).

The operation input analysis means 4 simply estimates the relative angles of the respective finger joints from information from the hand shape estimation means 3.

In this estimation, the operation input analysis means 4 selects angle information of each joint in correspondence with finger posture information of each finger according to the internal finger angle conversion table, and transfers the selected information.

FIG. 11 shows the loci of the respective joint points with respect to the operation points ($I_p$, $T_p$) of the forefinger and thumb in the holding motion of the hand.

FIG. 12 is a table showing the relative angles ($\theta_{I1}$, $\theta_{I2}$, $\theta_{I3}$) of the first, second, and third joints of the forefinger with respect to the angle (finger posture angle information: $\theta_I$) defined by the operation point ($I_p$) of the forefinger and the back of the hand.

The above finger angle conversion table processing is performed on the basis of this table in FIG. 12.

If the obtained finger posture angle information is middle data between the data values, the middle data is obtained by interpolation, thereby estimating the angle information of the finger joint.

The conversion method is not limited to this method, and the inverse kinematics method used in the above CG processing may be used.

In addition, the relationship between the above angle data and the finger posture angle information may be expressed by an n-dimensional function, and angle information may be estimated by substituting proper values into the function.

The host PC receives the information from this operation input device and can perform 3D model CG display like VR display without estimating any hand shape inside the PC.

Even in a PC system that cannot use multi-joint 3D model inverse kinematics processing or the like in CG processing, since the angle information of each finger of the operator can be known, CG display of each finger can be performed.

The two modes described above can be used for CG display like VR display and can also be used to analyze the gesture and the like of the hand on the host side.

In some case, however, a command operation input device for a PC need not know such hand shape information but needs to perform processing by using more abstract data.

A three-finger-related information data mode (3) is available.

Velocity information ($V_{bx}$, $V_{by}$, $V_{bz}$) and posture information ($\theta_{bx}$, $\theta_{by}$, $\theta_{bz}$) of transfer data which represent the spatial posture of the back of the hand are the same as those in the above modes. However, status information ($T_{stat}$, $I_{stat}$, $M_{stat}$) of each finger is added to the transfer data instead of the posture angle information of each finger.

Each status information indicates a specific point of a specific finger which each finger touches or that each finger touches nowhere.

As code information of each finger, the link symbols in FIG. 3 are used.

Figures 13A, 13B:
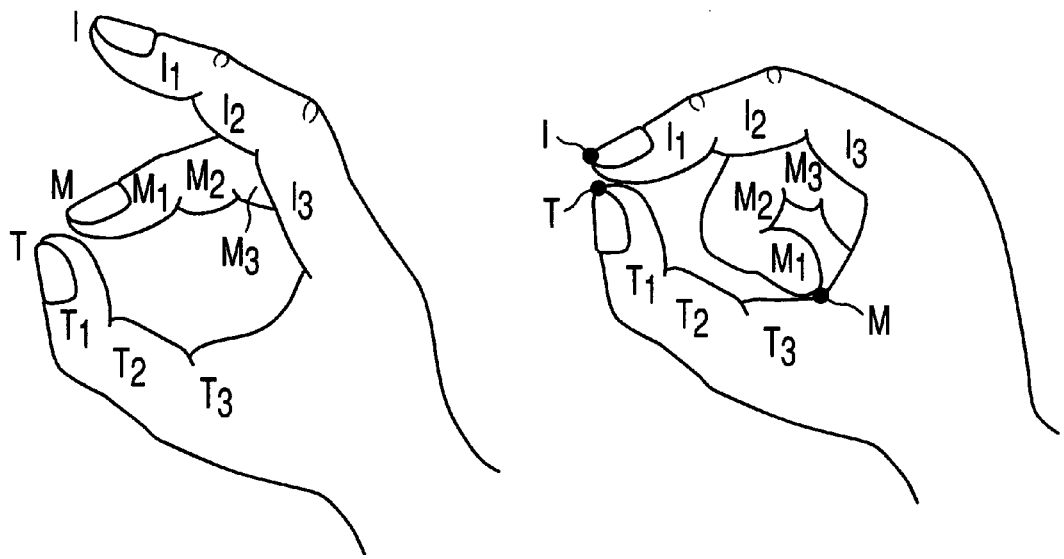
FIG. 13A is a view showing a state wherein the first link portions of the thumb and forefinger are in contact with each other as an example of a hand shape and transfer status.
FIG. 13B is a view showing a state wherein the first link portions of the thumb and forefinger are in contact with each other, and the middle finger is in contact with the third link portion of the thumb as an example of a hand shape and transfer status.

FIGS. 13A and 13B show hand shapes and transfer statuses in this case.

FIG. 13A shows a state wherein the first link portions of the thumb and middle finger are in contact with each other.

In this case, the status information is (T-$M_1$, I-O, M-$T_1$).

FIG. 13B shows a state wherein the first link portions of the thumb and forefinger are in contact with each other, and the middle finger is in contact with the third link portion of the thumb.

In this case, therefore, the status information is (T-I$_1$, I-T$_1$, M-T$_3$).

On the host PC side, when information is to be received from this operation input device, operation commands corresponding to combinations of pieces of status information of the respective fingers are set in advance in the form of a table, and internal processing can be executed upon reception of combination information for the table.

In addition, when such information is input, this information may be combined with information indicating, for example, a specific position and posture in which input operation is performed.

This greatly reduces the processing load on the host PC side and allows the operator to operate the PC with a simple hand shape or gesture.

A hand shape coding transfer mode (4) is available.

Velocity information ($V_{bx}$, $V_{by}$, $V_{bz}$) and posture information ($\theta_{bx}$, $\theta_{by}$, $\theta_{bz}$) of transfer data which represent the spatial posture of the back of the hand are the same as those in the above modes. However, a hand shape code number ($H_{code}$) is added to the transfer data.

In this case, a hand shape code number indicating one of pre-registered hand shapes which is determined as the most similar hand shape is transferred.

The operator can register hand shapes by himself/herself.

For example, a stone, scissors, and paper of "janken" can be respectively coded as 1, 2, and 3.

Upon reception of information from this operation input device and a hand shape code number required for internal processing in the PC, the host PC can perform the internal processing by only determining a specific position and specific posture in which the input operation is performed.

This greatly reduces the processing load on the host PC side, and allows the operator to operate the PC with simple hand shapes and gestures.

A pseudo-2D mouse mode (5) is available.

The transfer data contains X- and Y-axis position information ($P_{bx}$, $P_{by}$) obtained by internally time-integrating velocity information as translation information of the back of the hand and switch information (B1, B2) corresponding to the buttons of a mouse.

Note that velocity information ($V_{bx}$, $V_{by}$) may be transferred instead of position information.

In this pseudo-2D mouse mode, the operator can operate the pointer and buttons of the mouse in a pseudo manner in accordance with the position information of the back of the hand and operation of fingers.

In pointer operation, the operator moves the hand within a two-dimensional plane (X-Y plane) at a predetermined height ($P_{bz}$) registered during execution of pointer operation in the fixed spatial coordinate system OXYZ. The input device then computes movement information within the two-dimensional plane as position information ($P_{bx}$, $P_{by}$) and transfers the computed information.

At this time, when the operator moves the hand from the plane in the Z-axis direction and moves the hand in an X-Y plane in a similar manner, this position information ($P_{bx}$, $P_{by}$) is not updated.

This operation corresponds to the operation to be performed to change the mouse position without moving the point of the 2D mouse, and amounts to the operation of moving the mouse position while lifting the mouse in the air.

In this operation mode, the operator may perform operation while imaging a virtual plane in a space. The operator can also move the pointer by an operation method similar to that of a mouse with his/her hand being placed on an actual desk, lap, or the like.

(Button Operation)

In button operation, the left button (B1) of the mouse is operated by detecting contact between the thumb and the forefinger, and the right button (B2) is operated by detecting contact between the thumb and the middle finger.

When a desk, lap, or the like is to be used, a collision between the forefinger or middle finger and the desk, lap, or the like is recognized as button operation in the same manner.

Detection of these button operations will be described later.

While the thumb is in contact with each finger or each finger is in contact with the desk or the like, switch information (B1, B2) is "1". Otherwise, the switch information is "0".

When the host PC receives information from this operation input device and processes it as 2D mouse data, a conventional application or the like operated with the 2D mouse can be used as it is.

The operator can use such an application without exchanging the mouse with a 2D mouse.

In addition, this device is not limited to operation on a desk or the like unlike a conventional mouse, and can be used in any operation environment.

A pseudo-joystick mode (6) is available.

The transfer data contains position information (Pitch, Roll, Yaw) obtained by internally performing full-scale adjustment of tilt information representing the spatial posture of the back of the hand and switch information (B1) corresponding to a button.

This mode is the pseudo-joystick mode of performing joystick operation and button operation in accordance with tilt information of the back of the hand and operation of fingers.

Figure 14:
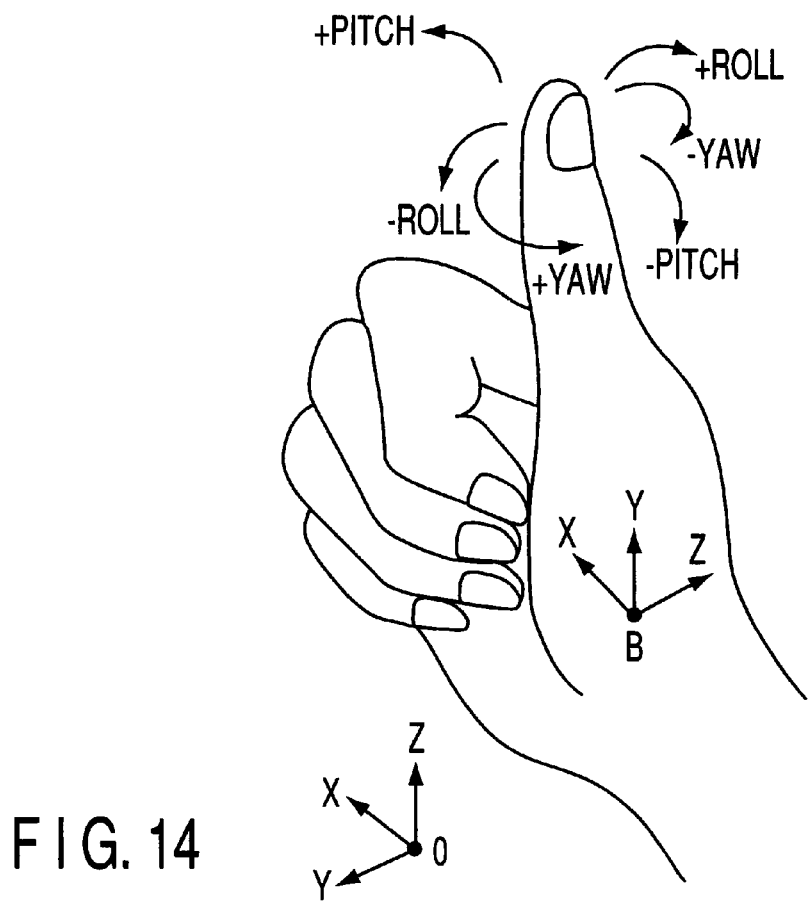
FIG. 14 is a view showing a hand shape during pseudo-joystick operation and pseudo-button operation and the manner of performing these operations in a pseudo-joystick mode in which these pseudo-operations are performed in accordance with tilt information of the back of the hand and motion of each finger.

FIG. 14 shows a hand shape in operation and the manner of operation.

In this state, the posture of the back of the hand is set in the vertical state (the Z-axis of the fixed spatial coordinate system OXYZ coincides with the Y-axis of the back-of-hand coordinate system BXYZ).

Information corresponding to the lateral tilt of the wrist (rotation about the X-axis of the back-of-hand coordinate system BXYZ) or the tilt amount is detected as lateral operation information of the joystick; information corresponding to the back-and-forth tilt of the wrist (rotation about the Z-axis of the back-of-hand coordinate system BXYZ) or the tilt amount, as back-and-forth operation information of the joystick; and information corresponding to lateral rotation of the wrist (rotation about the Y-axis of the back-of-hand coordinate system BXYZ) or the rotation amount, as rotation operation information of the joystick.

In addition, the erected and laid states of the thumb are detected as pseudo-button operations.

That is, switch information (B1) becomes "1" or "0" depending on whether the thumb is in contact with the third link portion (I3) of the forefinger.

As described above, the host PC receives information from this operation input device, and the information is processed as joystick data, thereby using a conventional application that has been operated with a joystick.

The operator can operate such an application without exchanging this device with a joystick.

In addition, this device is not limited to operation on a desk or the like unlike a conventional joystick, and can be used in any operation environment.

The velocity information ($V_{bx}$, $V_{by}$, $V_{bz}$) of transfer data in the processing modes (1) to (4) described above can be transferred as position information ($P_{bx}$, $P_{by}$, $P_{bz}$) obtained by time integration inside the device.

(Angular Sensor Collision Detection)

A "collision detection means" as an angle sensor of the finger posture detection means 1 in button operation processing in the pseudo-2D mouse mode will be described.

When a fingertip collides with something or an operation such as collision is executed, an angular velocity signal from the angular velocity sensor 7 can be detected as a characteristic motion signal.

Consider the motion of a finger that is raised and immediately lowered. When the finger is lowered, the angular velocity becomes zero immediately after the angular velocity becomes higher than a normal angular velocity.

Figure 17A:
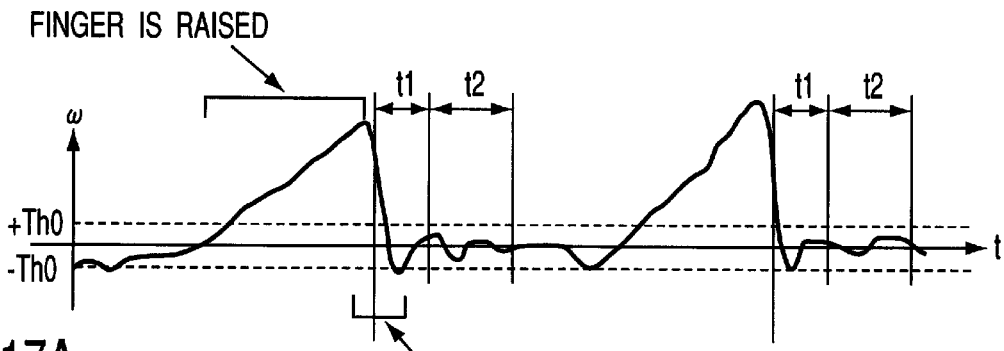
FIGS. 17A and 17B are graphs showing an angular velocity signal (ω) and angular velocity signal (ω') in an action of raising a finger and quickly lowering it, in which the angular velocity is higher than a normal angular velocity when the finger is lowered, and becomes zero at the next instant.
Figure 17B:

FIGS. 17A and 17B are graphs showing an angular velocity signal ($\omega$) and angular acceleration signal ($\omega'$) in this case.

The graphs of FIGS. 17A and 17B show how two continuous button operations are input.

FIG. 16 is a flow chart showing the processing performed by this collision detection means.

The finger shape estimation means 2 differentiates angular velocity information ($\omega$) from the angular velocity sensor 7 to obtain angular acceleration ($\omega'$) and always monitors that this value exceeds a given threshold (Th1).

Upon detecting that the value exceeds the threshold (step S1), the finger shape estimation means 2 waits for t1 seconds (step S2) and checks whether the angular velocity ($\omega$) is within the range of given thresholds ($\pm$Th0) (step S3).

Assume that the finger shape estimation means 2 determines that this angular velocity is with this range. In this case, the finger shape estimation means 2 waits for this state to continue for t2 seconds (step S4), and checks again whether the angular velocity is within the above range. If it is determined again that the angular velocity is within the range, the finger shape estimation means 2 notifies that the angular velocity sensor 7 has detected a collision (step S5).

The operation input analysis means 4 can determine button input operation in accordance with collision detection information concurrently with gesture analysis of the raising/lowering operation of the finger.

By detecting these phenomena in units of fingers, a collision operation pattern of each finger with some object can be detected, as if the finger colloides with something.

In addition, if such a collision is detected in relation to each finger, the relationship in contact between the thumb and the middle finger or between the thumb and the forefinger can be known.

Switch input operation using a desk, lap, or the like, virtual switch operation using the thumb, or the like can be performed without mounting any devices such as switches on the fingertips.

(Total Collision Detection)

A "total collision detection means" based on signal processing like that described above will be described with reference to the angular velocity sensors 14 used in the back-of-hand detection means 5 as well as fingers.

When the back-of-hand detection means 5 for generating an angular velocity signal upon rotation of the wrist and all the angular velocity sensors of the finger posture detection means 1 simultaneously detect this collision operation pattern by the same processing as that performed by the collision detection means, the resultant information is sent.

This allows the device to detect a clap from the fully open state of the hand (paper) and the fully closed state of the hand (stone).

By using detection of a collision of the entire hand as well as collisions of fingers, a virtual switch based on a combination of the detection result and the hand shape at this time can be used.

(Initialization Reset Operation)

An "initialization reset means" will be described next.

As described above, in angle measurement using angular velocity sensors, errors due to drifts are accumulated.

In general, therefore, the device cannot be used for a long period of time unless some measures are taken against drifts.

In a vibration type gyro, an error tends to occur due to vibrations such as collisions, and hence the probability of occurrence of errors in the operation of the "collision detection means" is high.

Pieces of hand shape information as initial hand shapes, i.e., the fully open state (paper) of the hand and the fully closed state (stone) of the hand, are stored in advance.

The first scheme is a means for forcibly changing the angle information of hand shape data into one of the initial hand shapes which is more similar to the current hand shape in accordance with detection information from the above "total collision detection means" when a shock is given without changing the current hand shape, e.g., the stone state or paper state.

Another method is a method of forcibly changing angle information to one of the initial hand shapes which is more similar to the current hand shape when the hand shape estimation means 3 continuously detects the above combination of hand shapes.

When "stone" and "paper" as hand shapes are continuously input, the hand shape data is changed to angle information of "paper" upon detection by the "initialization reset means".

This allows easy correction of hand shape error data due to drifts or the like and allows this device to be used without using any special devices such as sensor for correcting drifts in the angular velocity sensors.

Furthermore, there is no need to perform calibration and initialization to match the device with the shape of the hand of each operator when the device is to be mounted. That is, anyone can quickly initialize the device and start using it.

Reset hand shapes to be stored in advance are not limited to these patterns, and any shapes that hardly influence other normal operations can be stored.

(Internal Hand Shape Adaptive Reset Means)

An "internal hand shape adaptive reset means" will be described next.

This function is an advanced form of the above "initialization reset means".

The above "initialization reset means" functions only when a signal corresponding to a hand shape in an initial state is detected by the "total collision detection means". In contrast to this, according to this function, hand shapes corresponding to assumed button operations are stored in advance as well as initial hand shapes.

For example, hand shapes at the instant of performing assumed button operations and reset operations such as a hand shape at the instant of hitting a desk with the forefinger and a hand shape at the instant of hitting the thumb and forefinger each other are stored in advance.

When button operation or reset operation is performed, angle information is forcibly set to an internally stored hand shape value representing a hand shape closest to the current hand shape.

Since the operator can reset internal information intentionally or unintentionally, correcting operation for drifts and the like in the above angular velocity sensors can be performed at more timings.

In addition, since this operation is closed processing within this operation input device with respect to data processing modes (3) to (6) described above, the operation can be continuously performed without influencing an external host PC and the like.
(Mounting of Angular Velocity Sensors)

FIGS. 18A to 18D show how the angular velocity sensors 7 of the finger posture detection means 1 are mounted on the respective fingertips.

Figure 18A:
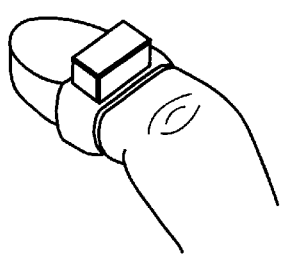
FIGS. 18A and 18B are views respectively showing the state of an angular velocity sensor 7 of the finger posture detection means 1 which is mounted on the tip of a finger other than the thumb when viewed from the front side, and the state of the sensor when viewed from the rear side.
Figure 18B:
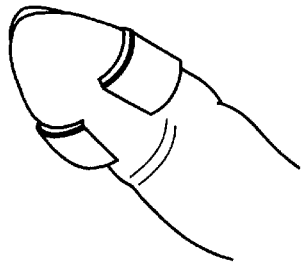

FIG. 18A shows the state of the sensor mounted on a finger other than the thumb when viewed from the front side. FIG. 18B shows the state of the sensor when viewed from the rear side.

As shown in FIGS. 18A to 18D, the angular velocity sensors are fixed on the upper surfaces of rings (in the form of a thimble) that are partly cut off. These rings can be fitted on the fingertips.

Figure 18C:
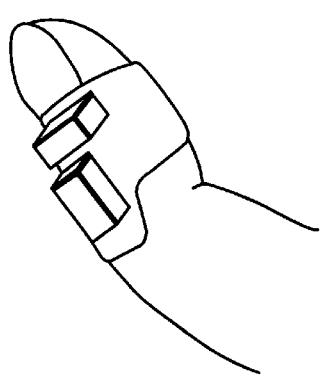
FIGS. 18C and 18D are views showing two different mounted states of sensors on the thumb.
Figure 18D:
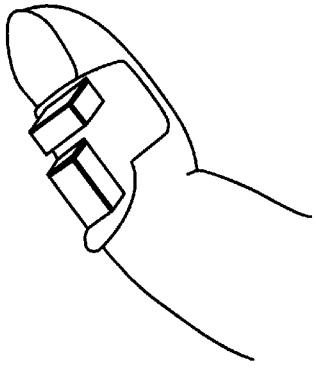

FIGS. 18C and 18D show two different mounted states of the rings on the thumb.

A thimble-like member having two angular velocity sensors mounted can be fitted on the thumb. More specifically, the angular velocity sensor 7 (Ty) of the thumb first posture detection means and the angular velocity sensor 7 (Tx) of the thumb second posture detection means are fixed on the upper surface of the thimble-like member.

Since the sensor for detecting the posture information of the fingertip is only required to be mounted on the fingertip, anyone can use this device regardless of the sizes of the hands of the users.

Since the fingertips and the like are not covered with this device unlike a glove-like device, the user can always wear the device and perform delicate work and operation with his/her fingertips without any interference.

In addition to the method of mounting this device in the form of a ring or thimble, a method of directly bonding the sensors on the nails of the respective fingers is also available.

In this case, the fingertips have no covers for the device. This allows the user to perform more delicate work and operation with his/her fingertips and always wear the device.
(Mounting of Back-of-Hand Detection Means)

Figure 19A:
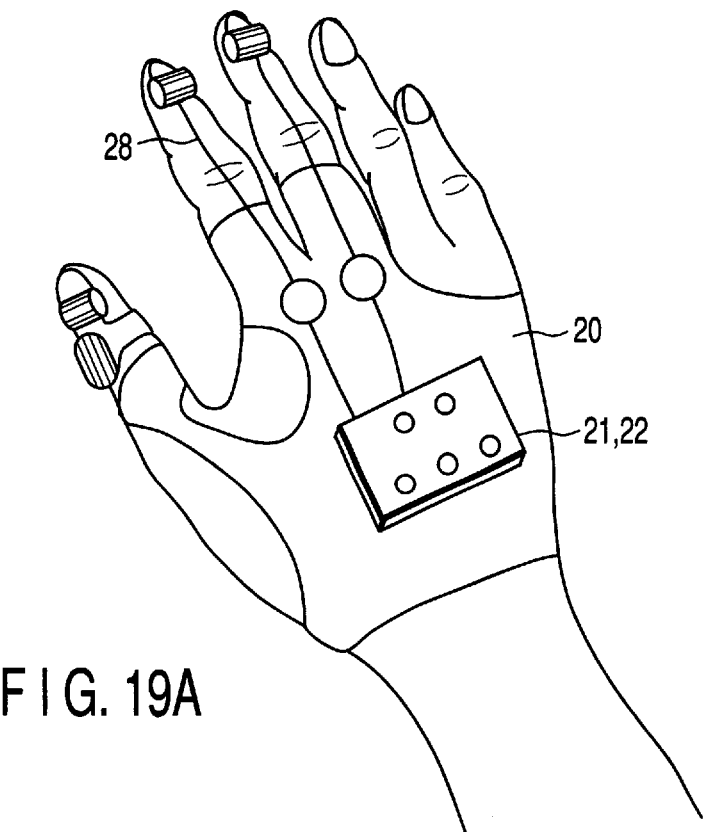
FIG. 19A is a view showing a state wherein various sensors of a back-of-hand detection means 5 and a control means 22 are fixed on the back of a glove 20 without finger portions while fixing members of the various sensors of the back-of-hand detection means 5 and the angular velocity sensors are mounted on the respective fingertips, thereby showing the overall state wherein this operation input device is mounted on the hand.
Figure 19B:
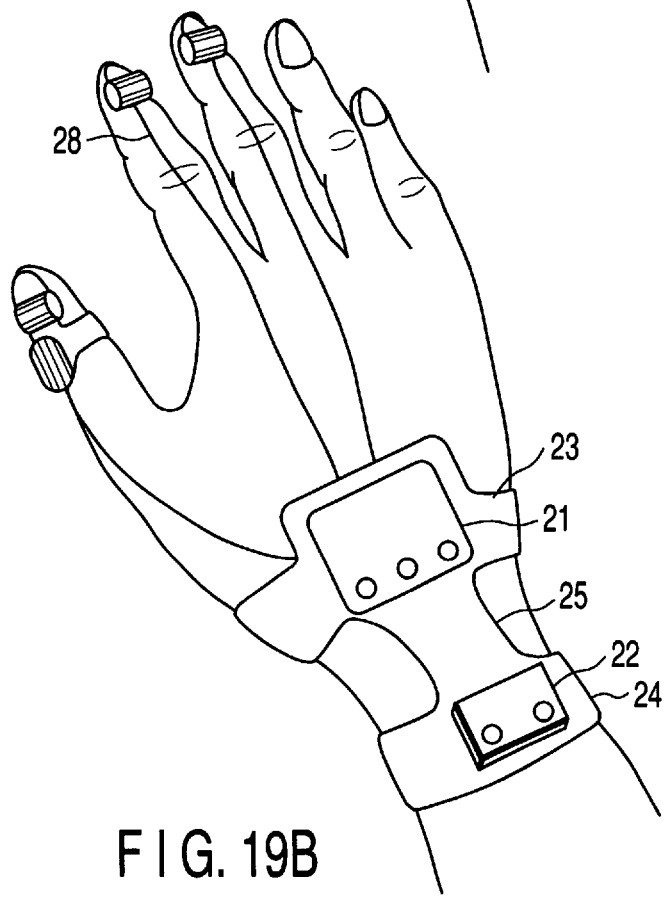
FIG. 19B is a view showing a state wherein the various sensors 21 of the back-of-hand detection means 5 are fixed on the back of a back-of-hand fixing section 23 as a fixing member of another scheme, a control means 22 is fixed on a wristband section 24 connected to the back-of-hand fixing section 23, and the wristband section 24 is fixed to the wrist.

Each of FIGS. 19A and 19B shows the overall mounted state of this operation input device.

Each of FIGS. 19A an 19B shows a fixing member for the respective sensors of the back-of-hand detection means 5 and a state wherein the angular velocity sensors described above are mounted on the respective fingertips.

Referring to FIG. 19A, various sensors 21 of the back-of-hand detection means 5 and a control means 22 are fixed on the back of a fingerless glove 20.

This fingerless glove 20 is used to fix these members on the back of the hand, and hence may be fixed at several positions on the hand. A fixing member and an adjustment function for this purpose can also be added to the glove. This allows the device to have a free size.

FIG. 19B shows a fixing member of another scheme.

The respective sensors 21 of the back-of-hand detection means 5 are fixed on the back of a back-of-hand fixing section 23. In addition, a control means 22 is fixed to a wristband section 24 connected to the back-of-hand fixing section 23 and is also fixed to the wrist.

The wristband section 24 is couple d to the back-of-hand fixing section 23 through a member 25 as an elastic deformation member.

This member 25 as the elastic deformation member is formed to bend in the inward direction of the wrist and always deform in the direction to come into tight contact with the back of the hand even if the wrist moves.

Since the back-of-hand fixing section 23 extends to the two sides of the hand and comes into tight contact with the palm, the section 23 can be kept fixed on the hand even if the wrist moves laterally.

The angular velocity sensors 7 of the finger posture detection means 1 and the fixing member used to fix the control means 22 are connected to each other through signal lines 28, as shown in FIGS. 19A and 19B.

Since the sensors for detecting the pieces of posture information of the fingertips and the respective sensors of the back-of-hand detection means 5 can be separately mounted, anyone can use this device regardless of the sizes of the hands of the users.

Since the fingertips and the like are not covered with this device unlike a glove-like device, the user can always wear the device and perform delicate work and operation with his/her fingertips without any interference.
(Other Combinations of Detection Sensors)

This embodiment has exemplified the operation input device using the position of the back of the hand detected by the back-of-hand detection means 5 and three fingers. However, the present invention is not limited to this. For example, the present invention can be applied to a one-finger type operation input device using the position of the back of the hand and the forefinger, a two-finger type operation input device using the position of the back of the hand and the forefinger and thumb, and an operation input device using the position of the back of the hand and all the five fingers. In addition, the present invention can be applied to an operation input device obtained by combining these devices and using the right and left hands.

The respective sensor elements are not limited those in this embodiment, and various types of sensor elements can be used.

Although the interface section 17 has not been described in detail above, this section can take various forms.

More specifically, as the interface section 17, a communication port conforming to general RS-232-C standard may be used. Alternatively, an interface section conforming to high-speed interface standards, such as a USB, may be used to communicate with a host PC.

In addition, as the interface section 17, an interface section of a wireless scheme using radio waves or light such as IrDa can be used.

If such a wireless interface section is used as the interface section 17, information is transferred only between the finger posture detection means 1 and the back-of-hand detection means 5 on the transfer means side, and various computation/estimation means in the CPU 11 in the reception means on the host side perform computation/estimation. This can reduce the size of the arrangement mounted on the hand and decrease the number of parts of the arrangement.

The present invention described in the above embodiment includes appendices (1) to (20) in addition to claims 1 to 3 as follows:
Appendix (1)

An operation input device for performing input operation on the basis of the shape, spatial position, posture, and motion of the hand of an operator is characterized by comprising a finger shape input means for estimating the shape of an overall finger (having first, second, and third joints) in a bent state by detecting the posture of the distal end portion of a finger with respect to the back of the hand of the operator.
Appendix (2)

An operation input device for performing input operation on the basis of the shape, spatial position, posture, and motion of a hand of an operator is characterized by comprising a hand shape input means for estimating the bent state of each finger by detecting the posture of the distal end portion of each finger with respect to the back of the hand of the operator, and estimating a hand shape in accordance with a relationship between the estimated finger shapes.

According to the present invention described in appendices (1) and (2), when the operator performs operation using the hand and fingers, the distal end portions of the fingers act as operation points. By detecting the postures of the distal end portions of the fingers with respect to the back of the hand, therefore, many operation forms of the hand can be detected. Hence, finger shapes and hand shapes can be estimated with a very small number of measurement points. This makes it possible to simplify the arrangement of the device.

Appendix (3)

An operation input device for performing input operation on the basis of the shape, spatial position, posture, and motion of a hand of an operator is characterized by comprising:

a back-of-hand detection means for detecting the spatial motion and posture of the back of the hand of the operator;

a spatial coordinate computation means for obtaining a position and posture in a three-dimensional space from information from the back-of-hand detection means;

finger posture detection means for detecting the bending motion and posture of a distal end portion extending from the first joint of each finger;

finger shape estimation means for estimating the shape of an overall finger by estimating the bending angle of the distal end portion of the finger with respect to the back of the hand from information detected by the spatial coordinate computation means and the finger posture detection means;

hand shape estimation means for estimating a hand shape from information of the overall shape of each finger from the finger shape estimation means; and operation input analysis means for analyzing operation input information on the basis of information from the spatial coordinate computation means and the hand shape estimation means, and determining a command to be input.

According to the present invention described in appendix (3), an operation input device for performing input operation on the basis of the shape, spatial position, posture, and motion of a hand of an operator can be provided. Therefore, ordinary actions and behaviors of the hand and fingers of the operator can be used as operation commands without imposing any burden on the operator, e.g., forcing the operator to learn a new operation method.

Appendix (4)

The operation input device according to appendix (3) is characterized in that the finger posture detection means comprises:

a thumb first posture detection means for detecting the bending motions and postures of the first and second joints of the thumb in the bending direction; and a thumb second posture detection means for detecting the bending motion of the third joint of the thumb from the back of the hand to the palm and the posture of the third joint.

According to the present invention described in appendix (4), the motion of the thumb can be detected with a simple arrangement without adding any new means by mounting two means having the same arrangement as that of the finger posture detection means.

Appendix (5)

The operation input device according to appendix (3) is characterized in that a detection means in the finger posture detection means comprises an angular velocity sensor.

Appendix (6)

The operation input device according to appendix (3) is characterized in that a detection means in the back-of-hand detection means comprises three acceleration sensors respectively disposed on three orthogonal axes, and detects the spatial translating motion and rotational posture of the back of the hand with the three angular velocity sensors.

According to the present invention described in appendices (5) and (6), the device size can be reduced by using compact elements such as angular velocity sensors, acceleration sensors, and the like.

Appendix (7)

The operation input device according to appendices (3) and (4) is characterized in that the finger posture detection means is mounted on only one finger other than the thumb, the thumb and another finger, the thumb and two other fingers, or the thumb and a plurality of other fingers.

According to the present invention described in appendix (7), there are many combinations of finger posture detection means, and the arrangement of the operation input device can be easily changed by changing the mounting positions of the means or the number of means to be mounted.

Appendix (8)

The operation input device according to appendix (4) is characterized by further comprising a joint angle estimation means for estimating the relative bending angular states of the first, second, and third joints of each finger by detecting only the bending angle of the distal end portion of each finger with respect to the back of the hand.

According to the present invention described in appendix (8), each finger joint corresponding to the angle of the distal end portion of each finger can be estimated by simple processing using a conversion table for converting each finger joint angle and table interpolation.

Appendix (9)

The operation input device according to appendices (3) and (4) is characterized in that the finger posture detection means is mounted on the upper surface of a thimble-like member or ring-like member mounted on the distal end portion extending from the first joint of each finger.

Appendix (10)

The operation input device according to appendices (3) and (4) is characterized in that the finger posture detection means is mounted on the nail of the distal end portion of each finger such that the means can be bonded to the nail.

Appendix (11)

The operation input device according to appendices (3) and (4) is characterized in that the back-of-hand detection means is mounted on the back of a fingerless glove.

According to the present invention described in appendices (9), (10), and (11), since the sensors for detecting pieces of posture information of the respective fingertips and the respective sensors of the back-of-hand detection means can be separately mounted, anyone can use the device regardless of the sizes of the hands of users. In addition, since the fingertips and the like are not covered with the device unlike a glove-like device, the user can perform delicate work and operation with his/her fingertips without any interference. This allows the user to always wear the device during operation.

Appendix (12)

The operation input device according to appendices (3) and (4) is characterized in that the operation input analysis means comprises a collision detection means for analyzing and determining a collision operation pattern between a finger on which the posture detection means is mounted and a desk or lap or between fingers.

Appendix (13)

The operation input device according to appendices (3) and (4) is characterized in that the operation input analysis means comprises a total collision detection means for analyzing and determining a collision operation pattern between all fingers and hand and a desk, floor, lap, or the like.

According to the present invention described in appendices (12) and (13), a virtual switch that can be used in any place using a desk, lap, or the like without requiring any new element like a switch, and switch input operation can be performed.

Appendix (14)

The operation input device according to appendix (13) is characterized by further comprising an initialization reset means for forcibly changing angle information of hand shape data to an initial hand shape similar to the current hand shape when pieces of initial hand shape information of a fully open state (paper) of the hand and a fully closed state (stone) of the hand are stored in advance, and a collision is detected by the total collision detection means.

Appendix (15)

The operation input device according to appendix (14) is characterized by further comprising an adaptive reset means for changing the current hand shape information to initial hand shape information representing a hand shape closest to the current hand shape when several pieces of initial hand shape information are stored in advance, and a collision is detected by the collision detection means.

Appendix (16)

The operation input device according to appendix (13) is characterized by further comprising an initial reset means for forcibly changing angle information to an initial hand shape closest to the current hand shape when pieces of initial hand shape information of a fully open state (paper) of the hand and a fully closed state (stone) of the hand are stored in advance, and these two hand shape data are continuously detected.

According to the present invention defined in appendices (14), (15), and (16), error data of a hand shape due to drifts and the like can be easily corrected, and the device can be used without using any special devices such as sensors for correcting drifts in the angular velocity sensors. Furthermore, there is no need to perform any special operation such as calibration and initialization to match the device with the hand shape of each user when the device is to be mounted. Anyone can readily initialize the device and can start using it. Since the operator can reset internal information intentionally or unintentionally, correcting operation for drifts and the like in the above angular velocity sensors can be performed at more timings.

Appendix (17)

The operation input device according to appendices (1) to (4) is characterized by further comprising a pseudo-2D mouse operation means for, when a hand moves to perform pseudo-2D mouse operation in a space, setting a height range, within the height range, updating information corresponding to the moving speed or amount of the hand in a back-and-force direction into one-axis mouse movement information, and updating information corresponding to the moving speed or amount of the hand in a lateral direction into one-axis mouse movement information, and outside the height range, updating no mouse movement information and setting detection information about a collision between the forefinger and the middle finger which is detected by the collision detection means as two pieces of button information, thereby allowing pseudo-2D mouse operation.

Appendix (18)

The operation input device according to appendices (1) to (4) is characterized by further comprising a pseudo-joystick operation means for, when a hand moves to perform pseudo-joystick operation in a space, performing the pseudo-joystick operation by setting information corresponding to the tilt or tilt amount of the wrist in a lateral direction as joystick lateral operation information, setting information corresponding to the tilt or tilt amount of the wrist in a back-and-force direction as joystick back-and-forth operation information, and setting information corresponding to the rotation or rotation amount of the wrist in the lateral direction as joystick rotating operation information, thereby performing pseudo-joystick operation.

According to the present invention described in appendices (17) and (18), since a conventional application that has been operated with a device such as a 2D mouse or joystick can be used as it is, the application can be operated without connecting any new device or exchanging the device with another device. In addition, this device is not limited to operation on a desk or the like unlike a conventional mouse, joystick, or the like and can be used in any operation environment.

Appendix (19)

The operation input device according to appendices (3) and (4) is characterized in that the operation input analysis means comprises a hand shape code processing means for, when several pieces of hand shape information and corresponding hand shape codes are stored in advance and a hand shape identical to one of the pieces of stored hand shape information is detected, transferring the corresponding hand shape code information.

Appendix (20)

The operation input device according to appendices (3) and (4) is characterized in that the operation input analysis means comprises a three-finger-related code processing means for transferring finger identification code information and link portion code information as finger-contact-related information indicting a specific portion of another finger which each finger touches or whether each finger does not touch any other fingers.

According to the present invention described in appendices (19) and (20), since the angle information of each finger joint and the like as in a hand shape input device are essentially unnecessary data for the operation input device, and ordinary actions and behaviors of the hand and fingers can be processed with more abstract codes, such ordinary actions and behaviors can be directly used as operation commands. In addition, the load of processing on the host PC side can be greatly reduced, and the operator can operate a PC with simple hand shapes and gestures.

As has been described above, therefore, according to the present invention, there is provided an operation input device which can be realized by a simple system configuration, imposes no new burden on the operator, eliminates the necessity to perform calibration and initialization when the operator wears the device, readily allows anyone to use the device, and allows the operator to perform delicate work and operation with his/her fingertips without any interference.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An operation input device comprising:
   back-of-hand detection means which is mounted on a back of a hand of an operator to detect a motion or posture of the back of the hand of the operator;
   spatial coordinate computation means for obtaining a position or posture of the back of the hand of the operator in a three-dimensional coordinate system on the basis of an output from said back-of-hand detection means;
   finger posture detection means which is mounted near a tip of a finger of the operator and which has a uniaxial sensor that detects a posture of the finger of the operator in a one-axis direction;
   finger shape estimation means for computing the posture of the finger with respect to the back of the hand of the operator from an output from said finger posture detection means by using an output from said spatial coordinate computation means;
   hand shape estimation means for obtaining an overall shape of the hand of the operator on the basis of the outputs from said back-of-hand detection means and said finger shape estimation means; and
   operation input analysis means for generating a command by a predetermined scheme on the basis of the outputs from said hand shape estimation means and said spatial coordinate computation means.

2. A device according to claim 1, further comprising shock detection means for detecting a collision operation pattern by the hand or finger of the operator.

3. An operation input device for performing an input operation on the basis of a shape, spatial position, posture, and motion of a hand of an operator, comprising:
   back-of-hand detection means for detecting a spatial motion or posture of a back of the hand of the operator;
   spatial coordinate computation means for obtaining a position or posture in a three-dimensional space on the basis of information from said back-of-hand detection means;
   finger posture detection means which has a uniaxial sensor that detects a bending motion or posture of a distal end portion extending from a first joint of each finger in a one-axis direction;
   finger shape estimation means for estimating an overall shape of a finger by estimating a bending angle of the distal end portion of the finger with respect to the back of the hand on the basis of pieces of information detected by said spatial coordinate computation means and said finger posture detection means;
   hand shape estimation means for estimating a shape of the hand on the basis of information of the overall shape of each finger from said finger shape estimation means; and
   operation input analysis means for determining a command to be input by analyzing operation input information from pieces of information from said spatial coordinate computation means and said hand shape estimation means.

4. A device according to claim 3, wherein said finger posture detection means further comprises:
   thumb first posture detection means for detecting bending motions or postures of the first and second joints of the thumb in a bending direction; and
   thumb second posture detection means for detecting a bending motion of the third joint of the thumb from the back of the hand to a palm or a posture of the third joint.

5. A device according to claim 3, wherein said finger posture detection means further comprises an angular velocity sensor.

6. A device according to claim 3, wherein said back-of-hand detection means comprises three acceleration sensors respectively disposed on three orthogonal axes, which detects a spatial translating motion and rotational posture of the back of the hand with said three angular velocity sensors.

7. A device according to claim 3, wherein said finger posture detection means is mounted on only one finger other than the thumb, the thumb and another finger, the thumb and two other fingers, or the thumb and a plurality of other fingers.

8. A device according to claim 4, further comprising joint angle estimation means for estimating relative bending angular states of first, second, and third joints of each finger by detecting only a bending angle of the distal end portion of each finger with respect to the back of the hand.

9. A device according to claim 3, wherein said finger posture detection means is mounted on an upper surface of a thimble-like member or ring-like member mounted on the distal end portion extending from the first joint of each finger.

10. A device according to claim 3, wherein said finger posture detection means is mounted on the nail of the distal end portion of each finger such that said means can be bonded to the nail.

11. A device according to claim 3, wherein said back-of-hand detection means is mounted on a back of a fingerless glove.

12. A device according to claim 3, wherein said operation input analysis means comprises collision detection means for analyzing and determining a collision operation pattern between a finger on which said posture detection means is mounted and a desk or lap or between fingers.

13. A device according to claim 3, wherein said operation input analysis means comprises total collision detection means for analyzing and determining a collision operation pattern between all fingers and hand and a desk, floor, lap, or the like.

14. A device according to claim 13, further comprising initialization reset means for forcibly changing angle information to that of an initial hand shape similar to the current hand shape when a collision is detected by said total collision detection means, wherein the initial hand shape data, fully open state (paper) hand shape data, and fully closed state (stone) hand shape data are stored in advance.

15. A device according to claim 14, further comprising adaptive reset means for changing the current hand shape information to initial hand shape information representing a hand shape closest to the current hand shape when a collision is detected by said collision detection means, wherein several pieces of initial hand shape information are stored in advance.

16. A device according to claim 3, further comprising initial reset means for forcibly changing angle information to that of an initial hand shape closest to the current hand shape when a fully open state (paper) of the hand and a fully closed state (stone) of the hand are continuously detected, wherein pieces of initial hand shape information of the fully open state (paper) of the hand and the fully closed state (stone) of the hand are stored in advance.

17. A device according to claim 3, further comprising pseudo-2D mouse operation means in which a height range can be set, (1) when an operator hand moves to perform pseudo-2D operation in a space within the height range, the pseudo-2D mouse operation means:

updates mouse movement information of one axis corresponding to a speed or amount of a movement of the mouse in a back-and-forth direction, updates mouse movement information of another axis corresponding to a speed or amount of a movement of the mouse in a lateral direction, (2) when an operator hand moves to perform pseudo-2D operation in a space without the height range, the pseudo-2D mouse operation means does not update mouse information of any axis, and (3) uses detection information about a collision between the forefinger and the middle finger which is detected by said collision detection means as two pieces of button information, thereby allowing pseudo-2D mouse operation.

18. A device according to claim 3, further comprising pseudo-joystick operation means for, when a hand moves to perform pseudo-joystick operation in a space, performing the pseudo-joystick operation by setting information corresponding to a tilt or tilt amount of the wrist in a lateral direction as joystick lateral operation information, setting information corresponding to a tilt or tilt amount of the wrist in a back-and-forth direction as joystick back-and-forth operation information, and setting information corresponding to rotation or a rotation amount of the wrist in the lateral direction as joystick rotating operation information, thereby performing pseudo-joystick operation.

19. A device according to claim 3, wherein said operation input analysis means comprises hand shape code processing means for, when several pieces of hand shape information and corresponding hand shape codes are stored in advance and a hand shape identical to one of the pieces of stored hand shape information is detected, transferring the corresponding hand shape code information.

20. A device according to claim 3, wherein said operation input analysis means comprises three-finger-related code processing means for transferring finger identification mode information and link portion code information as finger-contact-related information indicating a specific portion of another finger which each finger touches or whether each finger does not touch any other fingers.

21. An operation input device comprising:

a back-of-hand detection sensor unit which is mounted on a back of a hand of an operator to detect a motion or posture of the back of the hand of the operator;

a spatial coordinate computation software element for obtaining a position or posture of the back of the hand of the operator in a three-dimensional coordinate system on the basis of an output from said back-of-hand detection sensor unit;

a finger posture detection sensor unit which is mounted near a tip of a finger of the operator and which has a uniaxial sensor that detects a posture of the finger of the operator in a one-axis direction;

a finger shape estimation software element for computing the posture of the finger with respect to the back of the hand of the operator from an output from said finger posture detection software element by using an output from said spatial coordinate computation software element;

a hand shape estimation software element for obtaining an overall shape of the hand of the operator on the basis of the outputs from said back-of-hand detection sensor unit and said finger shape estimation software element; and an operation input analysis software element for generating a command by a predetermined scheme on the basis of the outputs from said hand shape estimation software element and said spatial coordinate computation software element.

22. An operation input device for performing input operation on the basis of a shape, spatial position, posture, and motion of a hand of an operator, comprising:

a back-of-hand detection sensor unit for detecting a spatial motion or posture of a back of the hand of the operator;

a spatial coordinate computation software element for obtaining a position or posture in a three-dimensional space on the basis of information from said back-of-hand detection sensor unit;

a finger posture detection sensor unit which has a uniaxial sensor that detects a bending motion or posture of a distal end portion extending from a first joint of each finger in a one-axis direction;

a finger shape estimation software element for estimating an overall shape of a finger by estimating a bending angle of the distal end portion of the finger with respect to the back of the hand on the basis of pieces of information detected by said spatial coordinate computation software element and said finger posture detection sensor unit;

a hand shape estimation software element for estimating a shape of the hand on the basis of information of the overall shape of each finger from said finger shape estimation software element; and an operation input analysis software element for determining a command to be input by analyzing operation input information from pieces of information from said spatial coordinate computation software element and said hand shape estimation software element.

* * * * *

UNITED STATES PATENT AND TRADEMARK OFFICE
CERTIFICATE OF CORRECTION

PATENT NO.    : 6,515,669 B1
DATED         : February 4, 2003
INVENTOR(S)   : Koh Mohri It is certified that error appears in the above-identified patent and that said Letters Patent is hereby corrected as shown below:

<u>Title page,</u>
Item [56], References Cited, U.S. PATENT DOCUMENTS, change "5,717,698" to -- 5,714,698 --.

Signed and Sealed this

Seventh Day of October, 2003

JAMES E. ROGAN
*Director of the United States Patent and Trademark Office*